United States Patent
Tanina

[19]

[11] Patent Number: 5,869,944
[45] Date of Patent: Feb. 9, 1999

[54] MOTOR DRIVING APPARATUS

[75] Inventor: Shoji Tanina, Chiba, Japan

[73] Assignee: Sony Corporation, Japan

[21] Appl. No.: 598,713

[22] Filed: Feb. 8, 1996

[30] Foreign Application Priority Data

| Feb. 16, 1995 | [JP] | Japan | ................................ 7-028510 |
| Feb. 17, 1995 | [JP] | Japan | ................................ 7-029883 |
| Feb. 17, 1995 | [JP] | Japan | ................................ 7-029884 |

[51] Int. Cl.$^6$ ...................................................... H02P 6/18
[52] U.S. Cl. ........................... 318/599; 318/293; 388/811
[58] Field of Search ..................................... 318/138, 254, 318/811, 599, 807, 258, 280, 287, 288, 290, 293; 388/811, 812

[56] References Cited

U.S. PATENT DOCUMENTS

| 4,544,868 | 10/1985 | Murty . | |
| 4,922,161 | 5/1990 | Gilliland et al. | ........................ 318/273 |
| 4,928,043 | 5/1990 | Plunkett | ................................ 318/254 |
| 5,172,036 | 12/1992 | Cameron | ................................ 318/138 |
| 5,309,078 | 5/1994 | Cameron | ................................ 318/811 |
| 5,350,988 | 9/1994 | Le | ........................................ 318/811 |
| 5,367,234 | 11/1994 | Ditucci . | |
| 5,384,527 | 1/1995 | Rozman et al. | ........................ 318/254 |
| 5,517,095 | 5/1996 | Carobolante et al. | .................. 318/254 |

FOREIGN PATENT DOCUMENTS 602 977 A2    6/1994   European Pat. Off. .

*Primary Examiner*—John W. Cabeca
*Attorney, Agent, or Firm*—Ronald P. Kananen

[57] ABSTRACT

A motor driving apparatus enabling direct pulse width modulation driving (direct PWM driving) in a sensor-less motor. The motor driving apparatus includes a comparison unit for comparing back-electromotive voltages appearing in respective phases of a multi-motor, a pulse width modulating unit for outputting pulse width modulated signals for rotationally driving the motor based upon a rotational error signal of the motor, a minimum pulse width detection unit for detecting the minimum pulse width position of the pulse width modulated signal from the pulse width modulation means, a sample-holding unit for sample-holding comparison outputs of the comparison means at a timing of detection of the minimum pulse width of the pulse width modulated signal from the minimum pulse width detection unit, and a motor driving unit for rotationally driving the motor based upon each sample-and-hold output from the sample-and-hold unit.

17 Claims, 29 Drawing Sheets

MOTOR DRIVING APPARATUS

BACKGROUND

Field of the Invention

This invention relates to a motor driving apparatus advantageously employed for a variety of equipment; and with built-in motors, such as a recording/reproducing apparatus for disc-shaped recording media, such as magnetic discs, magneto-optical discs or compact disc, video tape recorders, video camera apparatus or camera apparatus. More particularly, it relates to a motor driving apparatus enabling direct pulse width modulation driving (direct PWM driving) in a so-called sensor-less motor.

BACKGROUND OF THE INVENTION

There has hitherto been known a sensor-less driving system motor driving apparatus as shown in FIG. 1. If a U-phase coil 500U and a V-phase coil 500V of a three-phase motor 500 are fed with current, these coils 500U and 500V operate for generating a torque for acting as a motor. However, the remaining W-phase coil 500W operates as a generator to generate a back-electromotive force. The sensor-less driving system motor driving apparatus thus detects the rotational position of the rotor based upon the back-electromotive force generated in the respective phase coils 500U, 500V and 500W for switching control of the current conductive states of the phase coils 500U, 500V and 500W for rotational control.

That is, the back-electromotive forces Uin, Vin and Win, generated by the phase coils 500V, 500U and 500W, are fed via a filter circuit 501 to a comparator 502, while a common voltage COM of a common terminal 500a, which is a neutral point voltage of the three-phase motor 500, is fed via the filter circuit 501 to the comparator 502.

The filter circuit 501 is configured as shown in FIG. 2, wherein the back-electromotive force Uin from the U-phase coil 500U is fed to a low-pass filter 515 made up of a resistor 515a and a capacitor 515b. The back-electromotive force Uin from the V-phase coil 500V is fed to a low-pass filter 516 made up of a resistor 516a and a capacitor 516b, while the back-electromotive force Win from the W-phase coil 500W is fed to a low-pass filter 517 made up of a resistor 517a and a capacitor 517b. The common voltage COM from the common terminal 500a is fed to a low-pass filter 518 made up of a resistor 518a and a capacitor 518b.

With the sensor-less driving system motor driving apparatus, described above, the rotational position of a rotor is detected based upon the back-electromotive forces (voltages) Uin, Vin and Win from the phase coils 500U, 500V and 500W, and the current conduction timing of the phase coils 500U, 500V and 500W is switching-controlled responsive to the results of detection of the rotational position for rotationally driving a three-phase motor 500. During this rotational driving, a kickback noise is produced at the turn-off timing of current conduction switching for the phase coils 500U, 500V and 500W, as shown in FIG. 3a. This kickback noise, if left as it is, obstructs downstream side signal processing since it is overlaid on the back-electromotive voltages Vin, Uin and Win and the common voltage COM.

Thus the low-pass filters 515, 516 and 517 extract the kickback noise from the back-electromotive voltages Vin, Uin and Win from the low-pass filters 515 to 517 to transmit the extracted kickback noise as a reference voltage to the comparators 519 to 521.

The comparators 519 to 521 compare the common voltage COM to the back-electromotive voltages Vin, Uin and Win to transmit comparison outputs U, V and W shown in FIGS. 3b to 3d to a logic unit 508.

On the other hand, a full-wave rectifier circuit 503 is fed with a rotational servo signal (V control) formed in the rotational servo system based upon the rotational state of the three-phase motor 500. The full-wave rectifier circuit 503 full-wave rectifies the rotational servo signal which may be shifted in the plus and minus sides about the reference voltage as center and transmits the resulting signal as a reference value Vrec to a comparator 504. If the rpm of the three-phase motor 500 exceeds a pre-set value, the rotational servo signal is shifted in the minus side for lowering the rpm. Thus the full-wave rectifier circuit 503 on being fed with the minus side rotational servo signal generates reversing signals for applying a rotational braking and transmits the reversing signal thus generated to the logic unit 508.

A current detection resistor 511 (Risens) detects the current in the form of a voltage which is fed to the phase coils 500U, 500V and 500W from a driver 510 as later explained. The detected value (Current Sense) is integrated by a resistor 505a and a capacitor 505b so as to be supplied to the comparator 504.

The comparator 504 compares the reference value Vrec and the integrated value of the detected current (Current Sense) detected by the current detection resistor 511 and routes a comparison output Verr to a pulse width modulation circuit (PWM circuit) 506.

The PWM circuit 506 modulates the comparison output by pulse width modulation to form a pulse width modulated signal (PWM carrier) which is routed to a voltage conversion circuit 507. This indicates that the current driving is being carried out by pulse width modulation.

The voltage conversion circuit 507 is configured as shown in FIG. 4 in which a transistor 515 connected to a source voltage Vcc is driven in a switching operation by the pulse width modulated signal to form a pulse width modulated voltage corresponding to the pulse width modulated signal. This pulse width modulated signal is converted by a coil 516 and a smoothing capacitor 517 into a supply voltage VS which is supplied to the driving unit 510. The logic unit 508 detects an exclusive logical sum (Exor) of the comparison outputs U, V and W from the comparator 502, shown in FIGS. 3b to 3d, for forming an Exor signal shown in FIGS. 3b to 3d. The rising and falling edges of the Exor signal specify the zero-crossing points of the back-electromotive forces Vin, Uin and Win and the common voltage COM, respectively, as shown in FIGS. 3a and 3e. Thus the logic unit 508 detects the rising and falling edges of the Exor signal and captures the back-electromotive voltages Vin, Uin and Win at the detection timing. Based upon the back-electromotive voltages Vin, Uin and Win, the logic unit 508 forms an upper layer transistor control signal Uu and a lower layer transistor control signal Ui for the U-phase coil 500U, shown in FIGS. 3f and 3g, an upper layer transistor control signal Vu and a lower layer transistor control signal Vi for the U-phase coil 500V, shown in FIGS. 3h and 3i, and an upper layer transistor control signal Wu and a lower layer transistor control signal Wi for the W-phase coil 500W, shown in FIGS. 3j and 3k, and transmits these control signals to the driving unit 510.

When supplied with a reversing signal from the full-wave rectifier circuit 503, the logic unit 508 reverses the polarity of the control signals Uu, Ui, Vu, Vi, Wu and Wi and transmits the signals to the driving unit 510.

The driving unit 510 is made up of upper and lower layer transistors 521, 522 for the U-phase coil 500U, upper and lower layer transistors 523, 524 for the V-phase coil 500V, upper and lower layer transistors 525, 526 for the W-phase coil 500W, buffer amplifiers and resistors connected to the bases of the transistors 521 to 526, as shown in FIG. 5.

The collectors of the upper layer transistors 521, 523 and 525 are connected to input terminals of a supply voltage VS from the voltage conversion circuit 507, while the emitters of the lower layer transistors 522, 524 and 526 are connected to the current detection resistor 511. The emitters of the upper layer transistors 521, 523 and 525 are connected to the collectors of the lower layer transistors 522, 524 and 526. The driving current to be supplied to the phase coils 500U, 500V and 500W is taken out at the junction points between the collectors and the emitters of the respective transistors.

With the above-described driving unit 510, the control signals Uu, Ui, Vu, Vi, Wu and Wi from the logic unit 508 are routed to the bases of the upper and lower layer transistors 512 to 526, respectively. Thus the upper and lower layer transistors 512 to 526 are controlled to be turned on and off responsive to the control signals Uu, Ui, Vu, Vi, Wu and Wi so that the supply voltage VS is taken out at the respective junction points responsive to the on/off control. The supply voltage VS taken out at the respective junction points are fed to the respective phase coils 500U, 500V and 500W of the three-phase motor 500.

The values of the supply voltage VS, supplied to the phase coils 500U, 500V and 500W, are detected by the current detection resistor 511. These detected values are compared by the comparator 504 to the reference value Vrec for carrying out indirect PWM driving based upon the comparison output Verr. This enables the current conducting state in the respective phase coils 500U, 500V and 500W to be maintained at a constant level.

Since the motor driving device of the sensor-less driving system is capable of detecting the rotational position of the rotor by the back-electromotive force generated by each of the phase coils 500U, 500V and 500W for switching control of the current conducting state to the phase coils 500U, 500V and 500W, rotational control of a three-phase motor becomes possible without providing rotational position detection means, such as Hall devices.

If, with the above-described sensor-less motor driving apparatus, the voltage conversion circuit 507 is eliminated and the three-phase motor 500 is driven directly by PWM driving, the voltage of the respective phase terminals are decreased to the minus level at the voltage turn-off timing for the phase coils 500U, 500V and 500W, while the common voltage COM is decreased to the ground level, as shown in FIGS. 6a to 6c. At this time, it becomes impossible to detect the back-electromotive force. Even if the common voltage COM is decreased to the ground level, prediction can be made to a certain extent provided the voltage on/off width remains the same. However, the voltage on/off width naturally differs by reason of pulse width modulation driving, so that detection of the back-electromotive force at the voltage turn-off time and hence motor rotation control become infeasible.

For this reason, the conventional sensor-less motor driving apparatus cannot be driven directly by PWM driving, so that the PWM signal is fed via the voltage conversion circuit 507 to the driving unit 510. The result is that the number of component parts is increased in an amount equivalent to the voltage conversion circuit 507 thus raising the production cost. In addition, it is necessary with the conventional sensor-less motor driving apparatus to provide the filter circuit 501 for eliminating the kickback noise from the back-electromotive voltages Uin, Vin and Win of the respective phases and the common voltage COM, thus increasing the number of component parts and hence the production cost. In addition, since the electrical time constant of the filter circuit 501 is set in association with the rpm of the three-phase motor 500, the filter circuit 501 can be used only for constant rpm applications, such as for a disc reproducing apparatus configured for controlling the disc rotation at a constant angular velocity (CAV). Furthermore, the electrical time constant of the filter circuit 501 needs to be varied each time the rpm of the three-phase motor is varied. Although it may be contemplated to make automatic variable control of the electrical time constant of the filter circuit 501 responsive to the rpm of the three-phase motor, it becomes necessary to provide a special circuit for this purpose thus complicating the circuit structure and ultimately raising the production cost.

Although the filter circuit 501 is provided for eliminating the kickback noise in the conventional sensor-less motor driving apparatus, the kickback noise is superimposed at the current conduction switching timing as shown in FIGS. 3b to 3d. The result is that the kickback noise overlaid on the comparison outputs U, V and W was apparent in the Exor signal representing an exclusive OR output of the comparison outputs from the comparator 502, as shown in FIGS. 3b to 3d. Since the logic unit 508 captures the respective back-electromotive voltages at the timing of detecting the rising and decaying edges of the Exor signals, that is at the zero-crossing point of the back-electromotive force and the common voltage COM, the rising edge or the decaying edge cannot be detected correctly if the kickback voltage appears in the Exor signal, such that it becomes impossible to capture the respective back-electromotive voltages at a correct timing, thus obstructing correct current conduction switching timing control.

In addition, since the capturing of the respective back-electromotive voltages is carried out at the zero-crossing point, current conduction to an incorrect phase tends to be incurred if the back-electromotive force is of a small value, such as at the time of motor start-up or during low-speed rotation. If the current is supplied to an incorrect phase, motor rotation is not produced at the motor start-up time or motor rotation ceases during low-speed motor rotation, while the rpm of the motor is drastically lowered during normal motor rotation.

In addition, with the above-described sensor-less motor driving apparatus, both the short braking system generating the counter-torque by utilizing the motor current and the counter current supplying braking system generating the counter-torque by positively flowing the current in the motor from outside, are employed. However, there is no operational correlation between the two braking systems, and the two braking systems are employed separately, so that it becomes impossible to effect fine braking control.

With the above-described sensor-less motor driving apparatus, the upper layer transistors 521, 523 and 525 and the lower layer transistors 522, 524 and 526 shown in FIG. 5 are bi-polar transistors, which are turned on acutely but are turned off only gradually over a longer time interval. The result is that, if the transistors 521 to 526 are on/off controlled during inversion of the direction of current conduction, that is during inversion of the rotational direction, there is a time period during which the upper and lower layer transistors of the respective phases are turned on simultaneously, thus producing the through-current, that is the current flowing at a time to the ground from the voltage source VS via the upper and lower layer transistors.

With the above-described sensor-less motor driving apparatus, in which the driving currents of the respective phases are detected by the current detection resistor 511 and controlled so as to be constant, detection of the driving currents of the respective phases becomes inaccurate by such through-current, thus disabling correct rotational driving of the motor.

SUMMARY OF THE INVENTION

It is a primary object of the present invention to provide a motor driving apparatus whereby the PWM driving in the sensor-less system is enabled without providing a voltage conversion circuit 507 and mistaken operation due to the kickback noise may be prohibited without providing a filter circuit, while the back-electromotive force may be captured satisfactorily for prohibiting current conduction to an incorrect phase for improving motor starting characteristics.

It is a second object of the present invention to provide a motor driving apparatus whereby finer braking control becomes possible by operatively associating the short braking system and the counter current applying braking system with each other and occasionally by switching control between the two braking systems.

It is a third object of the present invention to provide a motor driving apparatus whereby the through-current may be prohibited from flowing for assuring correct rotational driving of the motor.

In one aspect, the present invention provides a motor driving apparatus including comparison means for comparing back-electromotive voltages appearing in respective phases of a motor having plural phases, pulse width modulating means for outputting pulse width modulated signals for rotationally driving the motor based upon a rotational error signal of said motor, minimum pulse width detection means for detecting the minimum pulse width position of the pulse width modulated signal from the pulse width modulation means, sample-holding means for sample-holding comparison outputs of the comparison means at a timing of detection of the minimum pulse width of the pulse width modulated signal by the minimum pulse width detection means, and motor driving means for rotationally driving the motor based upon each sample-and-hold output from the sample-and hold means.

The sample-and-hold means includes exclusive OR detection means for detecting an exclusive Or of comparison outputs of the comparator means, masking processing means for detecting the current supplying switching timing to respective phases for forming masking signals of a pre-set pulse width at the detected timing, removing the kickback noise overlaid on the exclusive OR outputs from the exclusive OR detection means at the current supplying switching timing to the respective phases, forming a masking signal of a pre-set pulse width at the detected timing, removing a kickback noise overlaid on the exclusive OR output of said exclusive OR detection means at the current supply switching timing by said masking signal and outputting a resulting masking processed signal, edge detection means for detecting the rising and falling edges of the masking processed output of the masking processing means, sampling means for sampling comparison outputs of the comparison means based upon an edge detection output of the edge detection means, sampling means for sampling each comparison output of the comparator means based upon the edge detection output of the edge detection means, and holding means for sample-holding the sampled output of the sampling means except for a phase for which a back-electromotive voltage is captured.

The motor driving apparatus according to the present invention also includes delay means for delaying the edge detection output of the edge detection means after delaying the edge detection output a pre-set time. The sampling means samples each comparison output from the comparator means based upon a delay output of the delay means for supplying the sampled comparison output to the holding means.

The motor driving apparatus according to the present invention also includes current supplying state switching controlling means for detecting whether or not the edge detection output of the edge detection means or a delayed output of the delaying means is being supplied, varying the contents of the holding means if the edge detection output or the delayed output are not supplied for a pre-set time for effecting switching control of the current supplying state to each phase of the motor.

The edge detection meas detects the rising edge and the falling edge of a masking processed output of the masking processing means, while also detecting the prevailing current conducting state and estimating, based upon the prevailing current supplying state, whether the edge of the masking processing output to be supplied next is a rising edge or a falling edge. The current supplying state switching controlling means inverts an output of the holding means if an edge other than the estimated edge is detected by the edge detection means for effecting switching control of the current supplying state to each phase.

The present invention also provides a motor driving apparatus including means for comparing each back-electromotive voltage appearing in each phase of a multi-phase motor and a common voltage which is a voltage at a neutral point of the motor, a reversing signal outputting means for outputting a reversing signal for applying a counter direction current supplying braking for generating a counter-torque by flowing the current through the motor based upon a motor rotation error signal supplied from outside, pulse width modulation means for outputting a pulse width modulated signal for rotationally driving the motor based upon the motor rotation error signal, minimum pulse width detection means for detecting the minimum pulse width position of the pulse width modulated signal from the pulse width modulation means, sampling means for sampling each comparison output of the comparator means at a detection timing of the minimum pulse width of the pulse width of the pulse width modulation signal from the minimum pulse width detection means, affected phase detection means for detecting on being fed with the reversing signal from the reversing signal outputting means a phase in which a change in each back-electromotive voltage is produced based upon each comparison output sampled by the sampling means, holding means for holding a comparison output of a phase other than the phase in which the change in the back-electromotive voltage as detected by the affected phase detection means is produced, and motor driving means for braking the motor based upon each sample-held output of the holding means.

The motor driving apparatus according to the present invention also includes maximum pulse width detection means for detecting the maximum pulse width position of the pulse width modulated signal from the pulse width modulation means and sampling the comparison outputs of the comparison outputs at the detection timing of the maximum pulse width. The motor driving means brakes the motor by short braking of generating a counter-torque in the motor until detection of the maximum pulse width of the pulse width modulated signal by the maximum pulse width detection means, while the motor driving means brakes the motor by counter direction current supplying braking on detection of the maximum pulse width of the pulse width modulated signal.

The present invention also provides a motor driving apparatus of a sensor-less system for detecting the rotational position of a multi-phase rotor based upon each back-electromotive voltage appearing in each phase of the multi-phase motor and for on/off controlling an upper layer transistor and a lower layer transistor of each phase responsive to the results of detection for switching the current supplying states to each phase for rotationally driving the motor. The motor driving apparatus includes switching timing detection means for detecting the timing of switching the direction of rotation, and controlling means for simultaneously turning off the upper layer transistor and the lower layer transistor of each phase for a pre-set time at the timing of switching of the rotational direction as detected by the switching timing detection means.

The motor driving apparatus according to the present invention also includes comparison means for comparing back-electromotive voltages appearing in respective phases of a multi-phase motor to a common voltage which is a neutral point voltage of the multi-phase motor, pulse width modulating means for outputting pulse width modulated signals for rotationally driving the motor based upon a motor rotation error signal, minimum pulse width detection means for detecting the minimum pulse width position of the pulse width modulated signal from the pulse width modulation means, sample-and-hold means for sample-holding comparison outputs of the comparison means at a timing of detection of the minimum pulse width of the pulse width modulated signal by the minimum pulse width detection means, and motor driving means for forming a control signal for each phase for on/off driving the upper layer transistors and the lower layer transistors based upon each sample-held output from the sample-and hold means.

The switching timing detection means detects the maximum pulse width position of the pulse width modulated signal for detecting the timing of switching the rotation position.

The motor driving apparatus according to the present invention is an apparatus of the sensor-less system of detecting the rotational position of the rotor based upon the back-electromotive force of each phase of a multi-phase motor and effecting switching control of the current supplying states responsive to the rotational position of the rotor. The comparator means compares the back-electromotive force appearing in each phase of the motor to the common voltage which is the neutral point voltage of the motor. The pulse width modulating means forms and outputs a pulse width modulation signal for rotationally driving the motor based upon a motor rotation error signal.

The minimum pulse width detection means detects the minimum pulse width position of the pulse width modulated signal from the pulse width modulation means. The minimum pulse width position specifies the period during which the pulse width modulated signal is turned on. The sample-and-hold means sample-holds the comparison outputs from the comparator means at the detection timing of the minimum pulse width of the pulse width modulated signal for detecting the back-electromotive force. The motor driving means rotationally drives the motor based upon the back-electromotive force of each phase which is a sample-held output of the sample-and-hold means.

This enables direct PWM driving of directly driving the motor by the pulse width modulated signal.

Specifically, the sample-and-hold means includes exclusive OR detections means, masking processing means, edge detection means, delaying means, sampling means and holding means.

The exclusive OR detection means detects the exclusive OR of the comparison outputs of the comparator means and transmits the results of detection to the masking processing means. The masking processing means detects the current supplying switching timing to the respective phases and forms the masking signals of the pre-set pulse width at this timing, and operates for removing the kickback noise overlaid on the exclusive OR output by the masking signal at the current supplying switching timing. The edge detection means detects the rising edge and the decay edge of the masking processing output of the masking processing means and transmits the detected edge to the sampling means. The sampling means samples comparison outputs of the comparison means based upon the edge detection output of the edge detection means. The holding means sample-holds the sampled output of the sampling means except that for the phase for which the back-electromotive force is captured, thus enabling the direct PWM driving.

If an iron core motor is employed as the motor, it is desirable to advance the current supplying phase slightly for correcting the delay in the driving current caused by coil inductance. Thus, with the motor driving apparatus according to the present invention, the delaying means delays the edge detection output of the edge detection means for a pre-set time and transmits the delayed output to the sampling means. This enables the delay in the driving current due to the coil inductance to be compensated to capture the back-electromotive force at a correct timing.

With the motor driving apparatus according to the present invention, the current supplying state switching controlling means detects whether an edge detection output is being supplied from the edge detection means or the delayed output is being supplied from the delaying means. The fact that the edge detection output or the delayed output is not supplied indicates that the motor is not being rotated in the prevailing current supplying state. Thus, if no edge detection output nor the delayed output is supplied, the current supplying state switching control means varies the contents of the holding means for switching the current supplying state to each phase of the motor. This enables motor start-up characteristics to be improved.

With the motor driving apparatus of the present invention, the edge detection means detects the rising edge and the falling edge of the masking processing output of the masking processing means and detects the prevailing current supplying state in order to predict whether the edge of the masking processing output to be supplied next is a rising edge or a falling edge. If the predicted edge is not supplied, it indicates that the motor is rotated in the reverse direction. Thus, if an edge other than the predicted edge is detected by the edge detection means, the current supplying state switching control means inverts an output of the holding means for switching the current supplying state to each phase. This enables the motor to be run in rotation in correct direction at all times.

The motor driving apparatus according to the present invention is a so-called sensor-less motor driving apparatus detecting the rotational position of the rotor based upon the back-electromotive force obtained for each phase of the motor and switches the current supplying state responsive to the rotational position of the rotor. The comparator means compares each back-electromotive force produced in each phase and a common voltage which is a neutral point voltage of the motor. The pulse width modulation means forms and outputs a pulse width modulated signal for rotationally driving the motor based upon the motor rotation error signal.

The minimum pulse width detection means detects the minimum pulse width position of the pulse width modulated signal from the pulse width modulation means. The minimum pulse width position specifies the period during which the pulse width modulated signal is turned on. The sampling means and the holding means detect the back-electromotive force by sample-holding each comparison output of the comparator means at the detection timing of the minimum pulse width of the pulse width modulated signal. The motor driving means runs the motor in rotation based upon the back-electromotive force of each phase which is this sample-held output.

This achieves direct PWM driving in which the motor is driven directly by the PWM signal.

The reversing signal outputting means outputs a reversing signal for applying reverse direction current supplying braking of flowing the current in the motor for generating the back-electromotive force based upon the motor rotation error signal supplied from outside. If fed with the reversing signal from the reversing signal outputting means, the affected phase detection means detects a phase for which are produced changes in each back-electromotive force based upon each comparison output sampled by the sampling means. The holding means holds and outputs one of the comparison outputs from the sampling means for a phase other than the phase for which are produced changes in the back-electromotive force as detected by the affected phase detection means. The motor driving means brakes the motor based upon each sample-held output of the holding means.

This enables counter direction current supplying braking in direct PWM driving.

The maximum pulse width detection means of the motor driving apparatus according to the present invention detects the maximum pulse width position of the pulse width modulated signal from the pulse width modulation means and samples the comparison outputs of the comparator means at the detection timing of the maximum pulse width. The motor driving means brakes the motor by short braking of generating the counter-torque in the motor based upon the motor rotating current until detection of the maximum pulse width of the pulse width modulated signal by the maximum pulse width detection means. If the maximum pulse width of the pulse width modulated signal is detected, the motor is braked by the counter direction current supplying braking.

Thus the short braking may be switched to the counter direction current supplying braking or vice versa according to requirements.

The motor driving apparatus according to the present invention is a sensor-less motor driving apparatus detecting the rotational position of the rotor based upon the back-electromotive force obtained for each phase of the motor and switches the current supplying state responsive to the rotational position of the rotor by on/off controlling the upper and lower layer transistors of each phase for rotationally driving the motor. The switching timing detection mans detects the rotational direction switching timing.

During the time of switching the rotational direction, the upper layer transistor is controlled to be turned off, while the lower layer transistor is controlled to be turned on. Since the transistor has characteristics of rising sharply and decaying gradually over a certain time when turned on and off, respectively, the turn-off period of the upper layer transistor is partially overlapped with the turn-on period of the lower layer transistor, so that a through-current is produced. Thus the control means turns the upper and lower layer transistors of the respective phases simultaneously for a pres-set time at the rotational direction switching timing as detected by the switching timing detection means. The time period during which the two transistors are compulsorily turned off, corresponding to the time period during which the two transistors are turned on, may be set for the particular transistors in use. Thus it becomes possible to switch the current supplying states to the respective phases after complete switching of the on-off control states of the two transistors to prevent the through-current.

For realizing direct PWM driving of directly rotationally driving the motor by PWM signal, the comparator means of the motor driving apparatus of the present invention compares the back-electromotive force induced in each phase of the motor to the common voltage which is the neutral point voltage of the motor. The pulse width modulation means forms and outputs a pulse width modulated signal for rotationally driving the motor based upon the motor rotation error signal. The minimum pulse width detection means detects the minimum pulse width position of the pulse width modulation signal from the pulse width modulation means. The position of the minimum pulse width specifies the period during which the PWM signal is turned on. The sample-and-hold means sample-holds each comparison output of the comparator means at the detection timing of the minimum pulse width of the PWM signal.

With direct PWM driving, each comparison output of the comparator means is varied with the PWM signal thus making it impossible to detect the back-electromotive force. If, however, each comparison output is sample-held during the period when the PWM signal is turned on, the back-electromotive force can be detected even during direct PWM driving. The motor driving means runs the motor in rotation based upon the back-electromotive force in each phase which is the sample-held output of each sample-and-hold means.

When carrying out such direct PWM driving, the switching timing detection means of the motor driving apparatus according to the present invention detects the maximum pulse width position of the PWM signal. The maximum pulse width position of the PWM signal specifies the rotational direction switching timing. Thus the control means controls the two transistors simultaneously at the maximum pulse width timing for thereby prohibiting the through-current as described above.

DETAILED DESCRIPTION OF THE PREFERRED EMBODIMENTS

Figure 1:
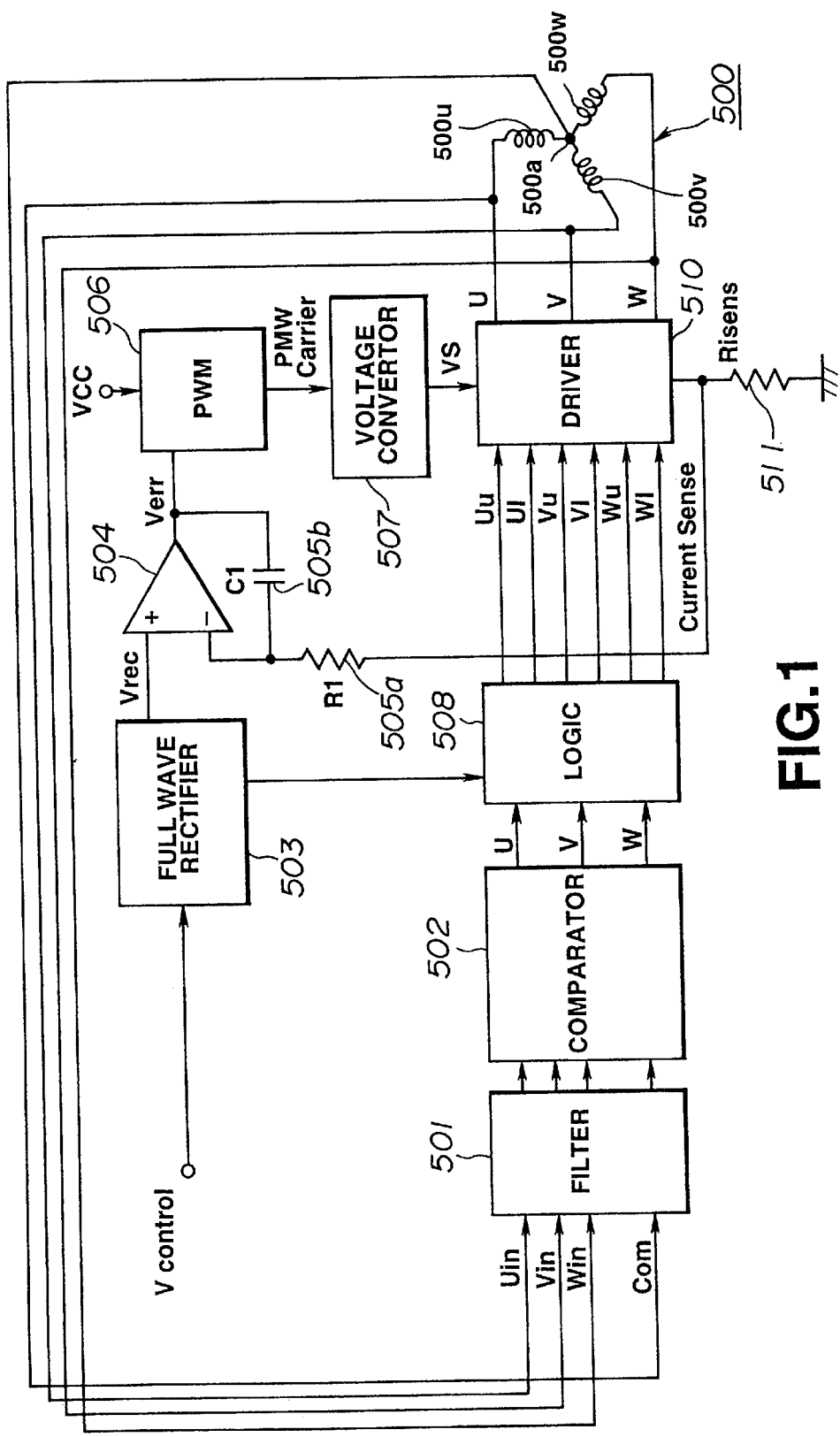
FIG. 1 is a block diagram showing a conventional motor driving apparatus.
Figure 2:
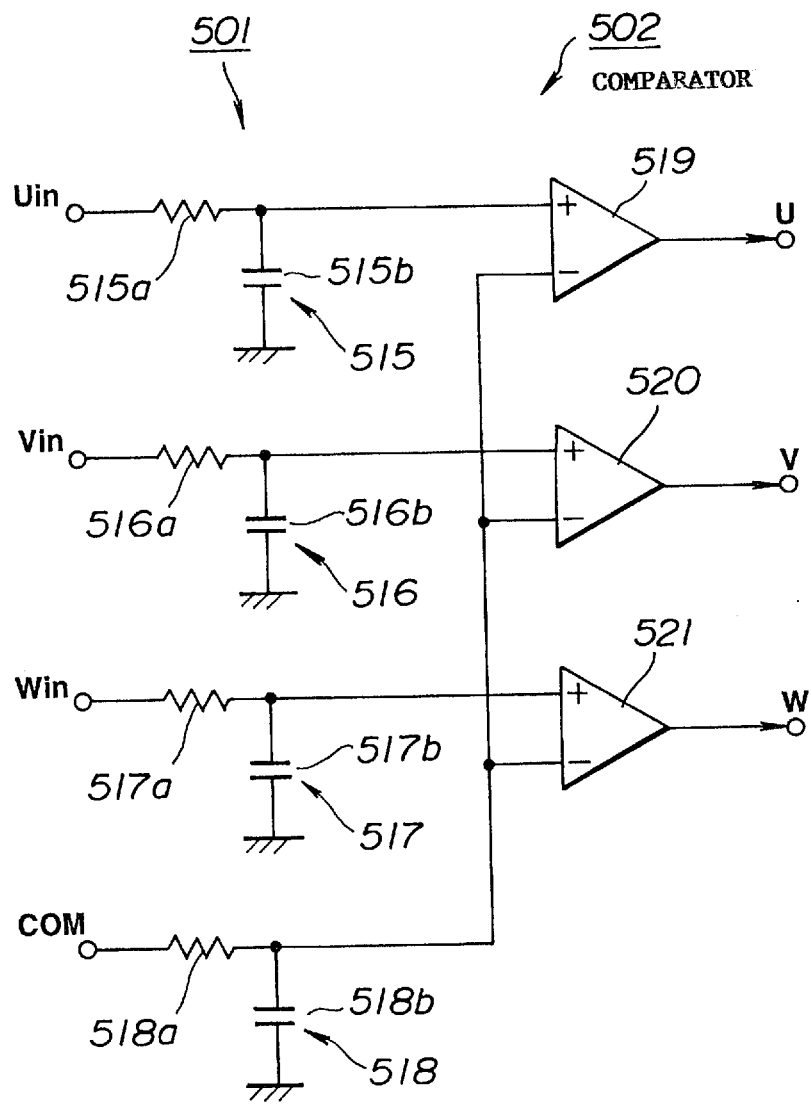
FIG. 2 is a circuit diagram of a filter circuit and a comparator provided in the conventional motor driving apparatus.
Figure 3:
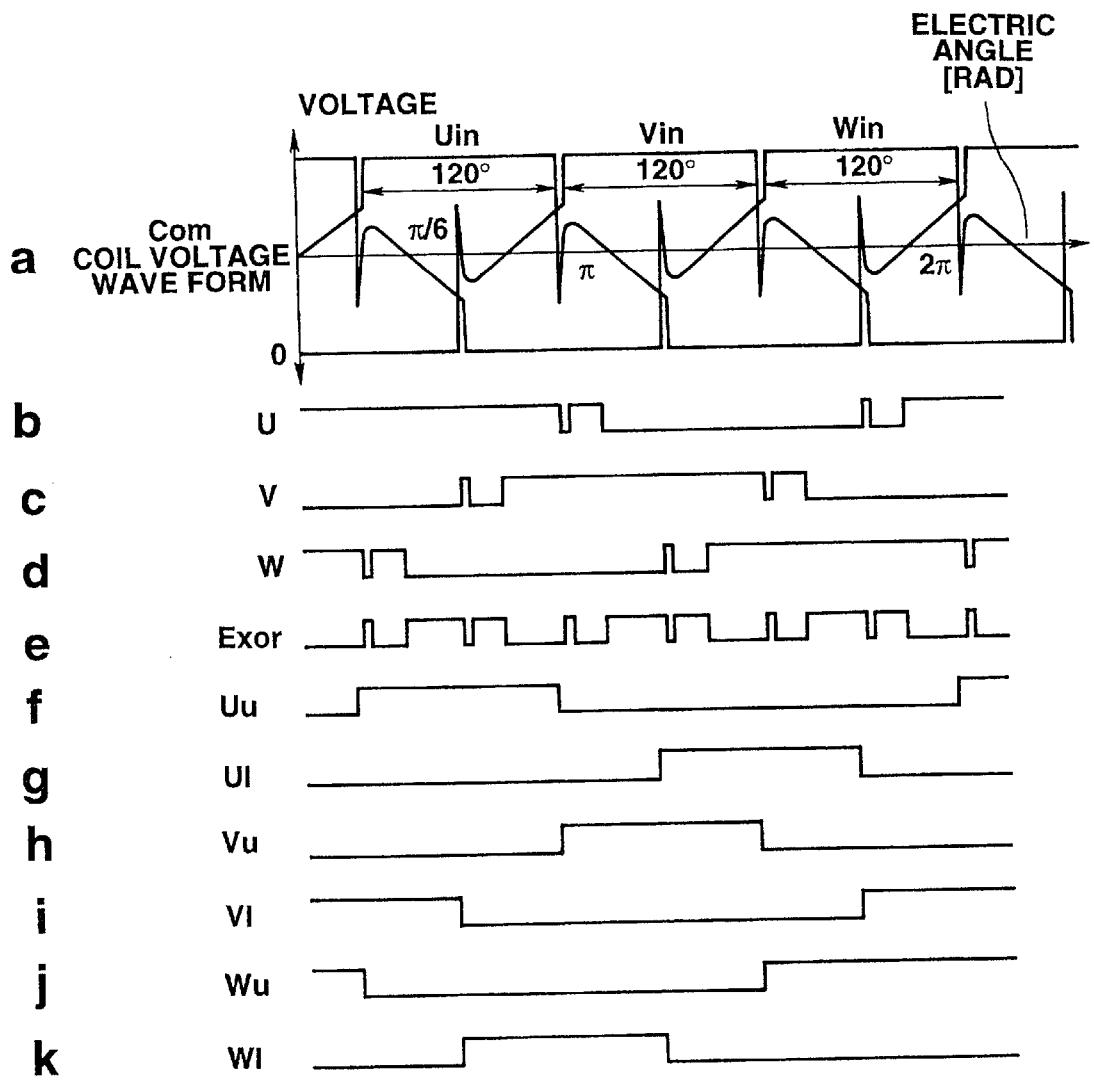
FIG. 3 is a timing chart for illustrating the operation during normal rotation of the conventional motor driving apparatus.

Referring to the drawings, preferred embodiments of a motor driving apparatus according to the present invention will be explained in detail.

Figure 7:
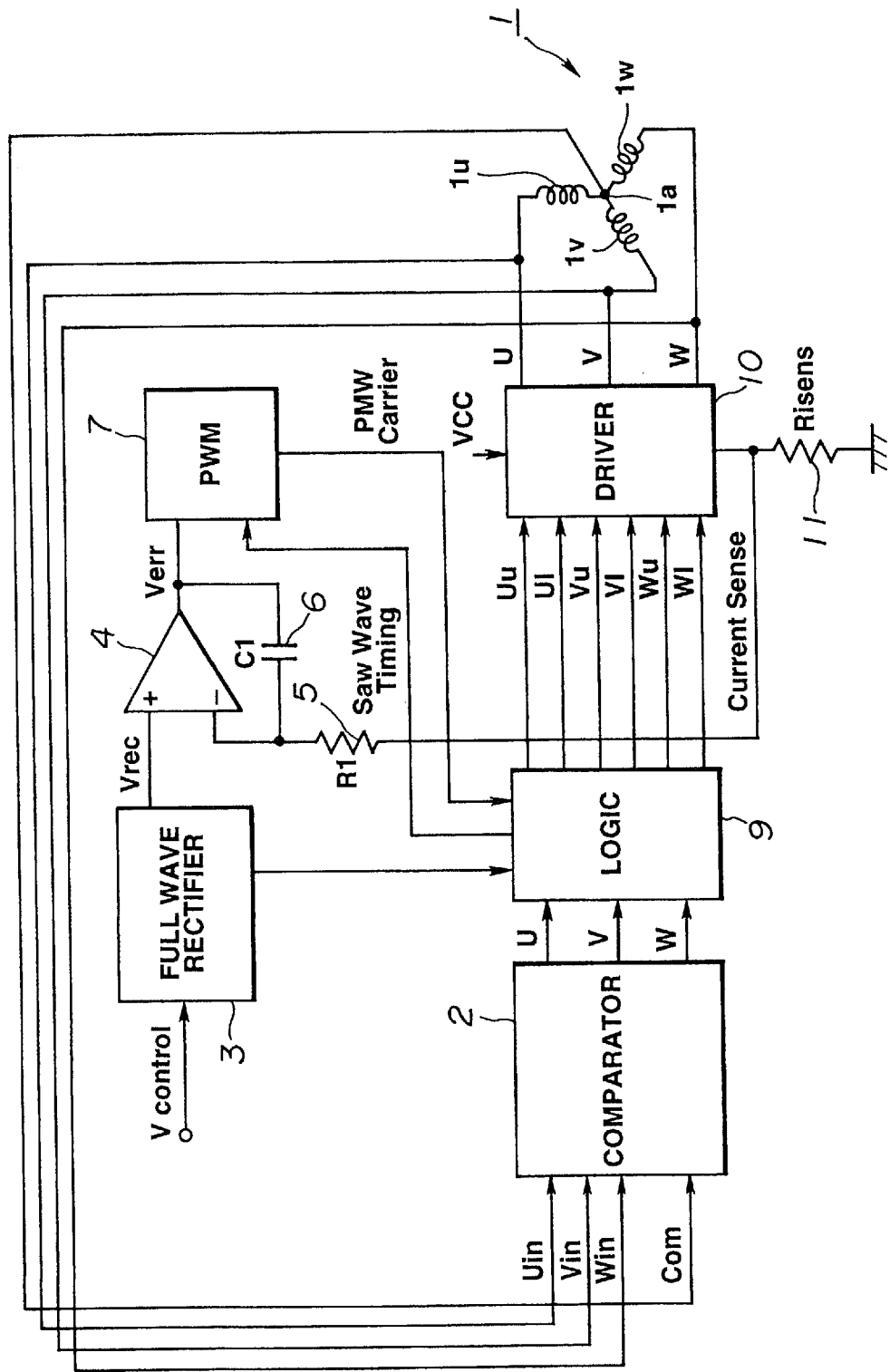
FIG. 7 is a block diagram showing an embodiment of the motor driving apparatus according to the present invention.

The motor driving apparatus embodying the present invention is a so-called sensor-less motor driving apparatus, and includes a comparator 2 for comparing back-electromotive voltages Uin, Vin and Win generated in a U-phase coil 1U, a V-phase coil 1V and in a W-phase coil 1W, respectively, to a reference common voltage COM, generated at a neutral point of a three-phase motor 1. The motor driving apparatus also has a full-wave rectifier 3 for full-wave rectification of a rotational servo signal (V control) of the three-phase motor 1, for outputting a rectified signal as a reference signal Vrec, for outputting a reversing signal for applying a rotational braking to the three-phase motor 1 when a minus sign rotational servo signal is supplied thereto, and for applying a rotational braking to the three-phase motor 1, as shown in FIG. 7.

The motor driving apparatus includes a logic unit 9 for generating and outputting control signals Uu, Ui, Vu, Vi, Wu and Wi for driving a driver 10 and for driving a PWM circuit 7, based upon the pulse width modulated signal from the PWM circuit 7, comparison signals U, V and W from the comparator 2 and the reversing signal from the full-wave rectifying circuit 3. The motor driving apparatus also includes the driver 10 for driving the three-phase motor 1 responsive to the control signals Uu, Ui, Vu, Vi, Wu and Wi from the logic unit 9, and a current detection resistor 11 for detecting the driving current of the three-phase motor 1 in the form of a voltage and for supplying the resulting voltage to a comparator 4 via an integration circuit consisting of a resistor 5 and a capacitor 6.

The operation of the above-described motor driving apparatus of the instant embodiment is as follows: If the current is supplied to, for example, the U-phase coil 1U and the V-phase coil 1V of the three-phase motor 1, the U-phase coil 1U and the V-phase coil 1V operate for generating the torque and thus act as a motor. However, the remaining W-phase col 1W operates as a generator for generating a back-electromotive voltage. The motor driving apparatus of the instant embodiment is configured for detecting the rotational position of the rotor based upon the back-electromotive voltages generated in the phase coils 1U, 1V and 1W for switching control of the current conducting state responsive to the results of detection for rotationally driving the three-phase motor 1.

Figure 8:
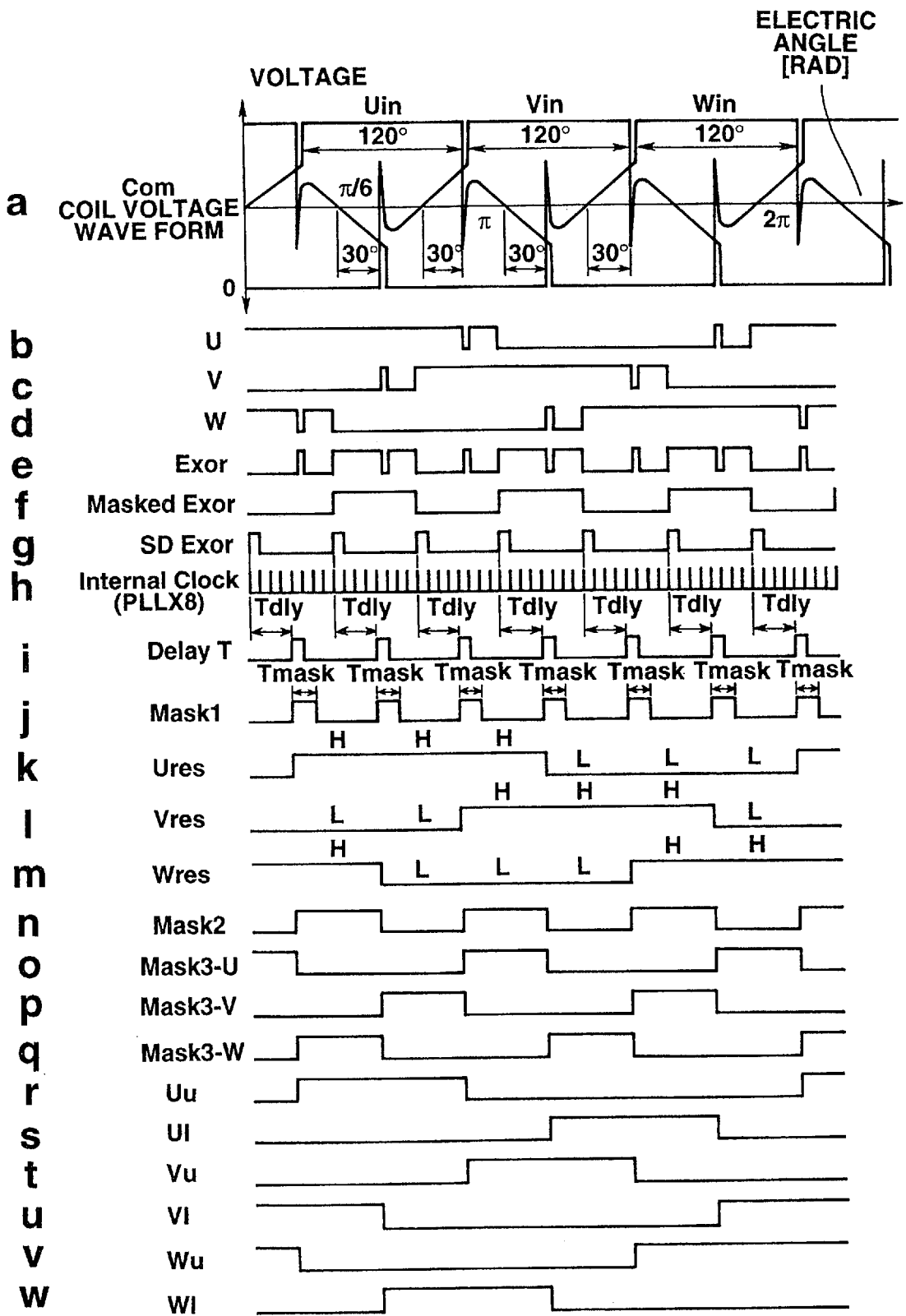
FIG. 8 is a timing chart for illustrating the operation during normal rotation of the motor driving apparatus shown in FIG. 7.

Specifically, the back-electromotive voltages Uin, Vin and Win, generated in the phase coils 1U, 1V and 1W, as shown in FIG. 8, and the common voltage COM at a common terminal 1a, which is a voltage at a neutral point of the three-phase motor 1, are fed to the comparator 2.

Figure 9:
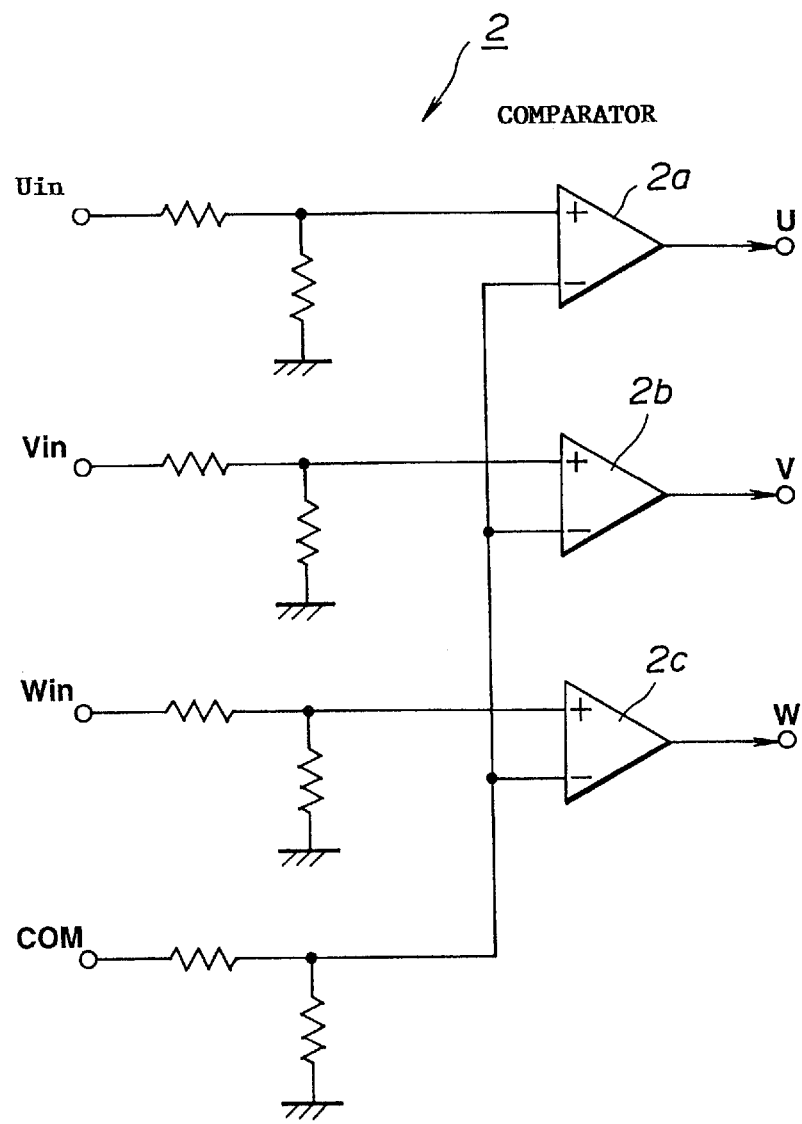
FIG. 9 is a circuit diagram for comparing the common voltage and the back-electromotive force in each phase coil provided in the motor driving apparatus shown in FIG. 7.

The comparator 2 is made up of three comparators 2a to 2c for the U-phase, V-phase and the W-phase, as shown in FIG. 9. The common voltage COM is fed as a reference voltage to each of the comparators 2a to 2c. The back-electromotive voltages Uin, Vin and Win are supplied via resistors to the comparator 2a for U-phase, comparator 2b for V-phase and to the comparator 2c for W-phase, respectively. The comparators 2a to 2c compare the back-electromotive voltages Uin, Vin and Win, with the common voltage COM as a reference, as shown in FIG. 8a, to generate comparison signals U, V and W, shown in FIGS. 8b to 8d. These comparison signals are routed to the logic unit 9.

The kickback noise, shown in FIGS. 8b to 8d, is superimposed on the comparison signals U, V and W at the current conduction switching timing to the respective phase coils 1U, 1V and 1W, respectively.

Figure 10:
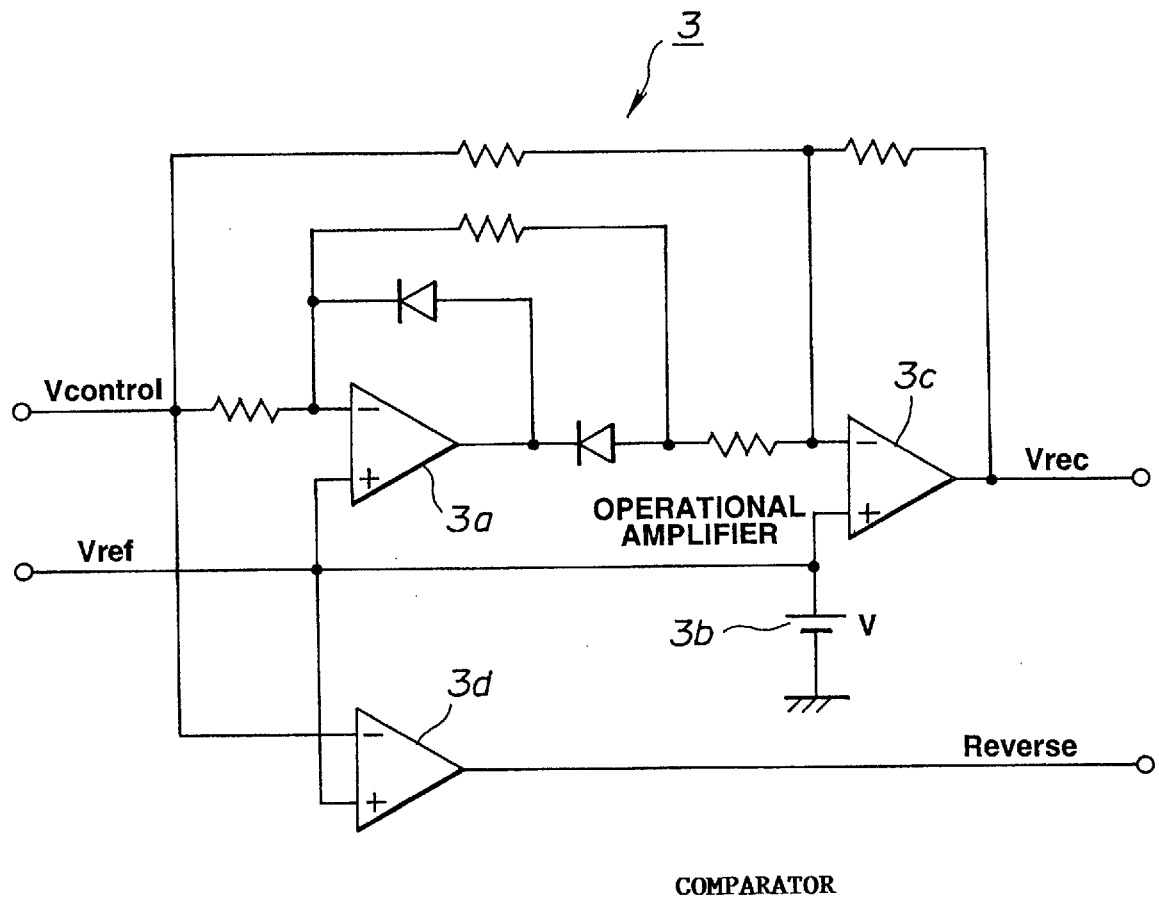
FIG. 10 is a circuit diagram showing a full-wave rectifier circuit provided in the motor driving apparatus shown in FIG. 7.

The full-wave rectifier circuit 3 is configured as shown in FIG. 10 and has a first comparator 3a for comparing the rotational servo signal (V control), generated by the rotational servo system or a digital signal processor (DSP), based upon the rotating state of the three-phase motor 1, to the reference voltage from the reference voltage generating circuit 3b, and a second comparator 3c for comparing the comparison output of the first comparator 3a to the reference voltage, for full-wave rectification of the rotational servo signal. The full-wave rectified rotational servo signals are outputted as the reference voltage Vrec.

If the rpm of the three-phase motor 1 exceeds a pre-set value, the rotational servo signal is the minus input for lowering the rpm. Thus the full-wave rectifier circuit 3 compares the reference voltage to the rotational servo signal in a third comparator 3d. If supplied with the minus-input rotational serv signal, the full-wave rectifier circuit 3 forms a reversing signal (Reverse) for applying a rotational braking to the three-phase motor 1 and transmits the reversing signal (Reverse) to the logic unit 9 as later explained.

The current detection resistor 11 (Risens) detects the current supplied to the respective phase coils 1U, 1V and 1W, in the form of a voltage. This detection signal (Current Sense) is integrated by the integration circuit consisting of the resistor 5 and the capacitor 6 so as to be supplied to the comparator 4.

The comparator 4 compares the reference signal Vrec from the full-wave rectifier circuit 3 to the integrated detection signal (Current Sense) detected by the current detection resistor 11 and routes the comparison output Verr to the pulse with modulation (PWM) circuit 7.

The PWM circuit 7 modulates the comparison output by pulse width modulation to form a pulse width modulated signal (PWM Carrier) which is supplied to the logic unit 9. This indicates that the current driving by pulse width modulation is being carried out.

Figure 11:
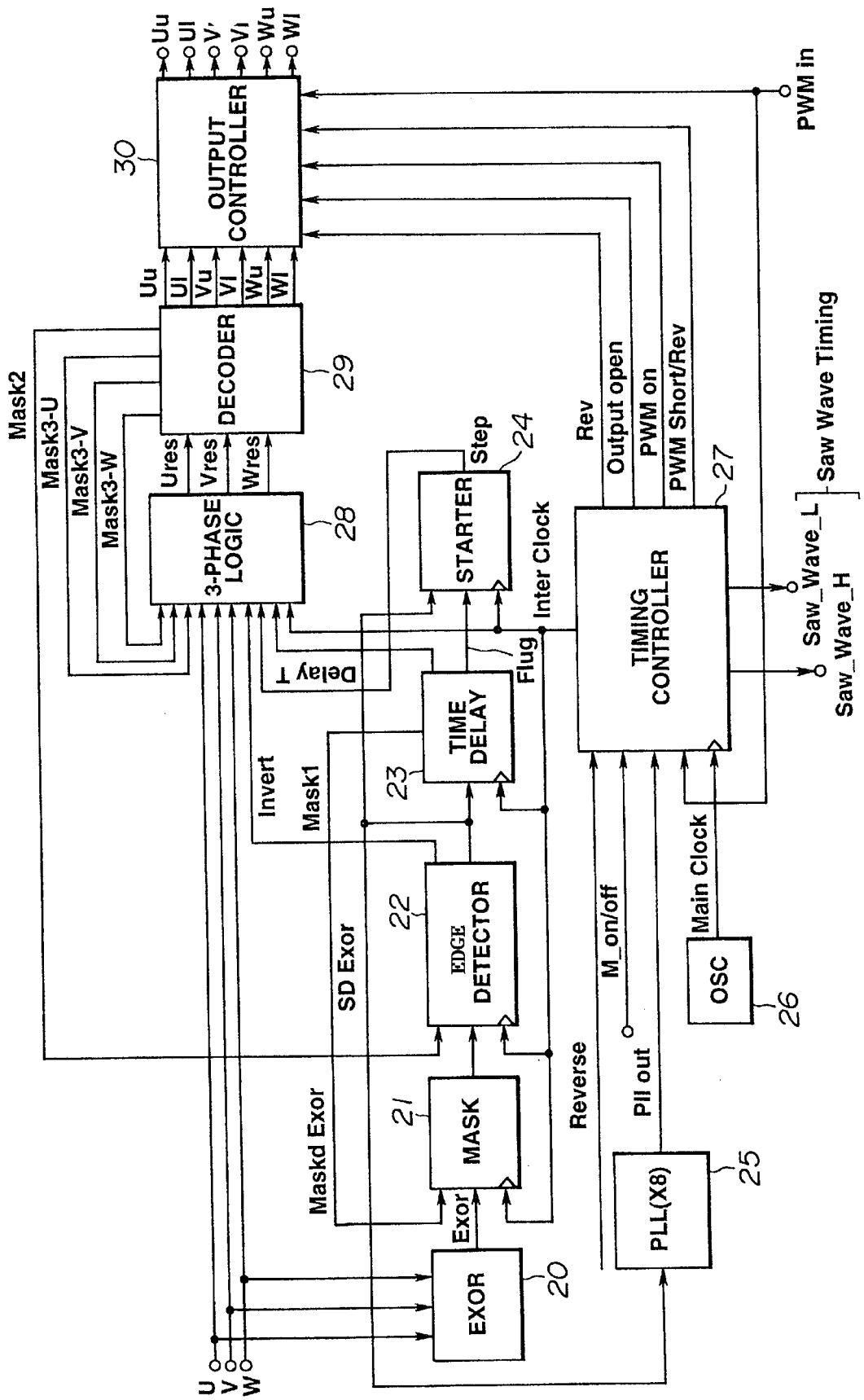
FIG. 11 is a block diagram of a logic unit provided in the motor driving apparatus shown in FIG. 7.

The logic unit 9 is configured as shown in FIG. 11, in which the comparison signals U, V and W, having the kickback noise from the comparator 2 superimposed thereon, are supplied to an exclusive OR (Exor) circuit 20 and a three-phase logic unit 28.

The Exor circuit 20 takes an exclusive OR of the comparison signals U, V and W to form an Exor signal shown in FIG. 8e. The Exor signal, thus generated, is supplied to a masking circuit 21. Since the kickback noise is superimposed on the comparison signals U, V and W, the kickback noise is superimposed on the Exor signal as well. The rising edge and the decay edge of the Exor signal specifies the zero-crossing points of the common voltage COM and the back-electromotive voltages Uin, Vin and Win as shown in FIG. 8a.

Figure 12:
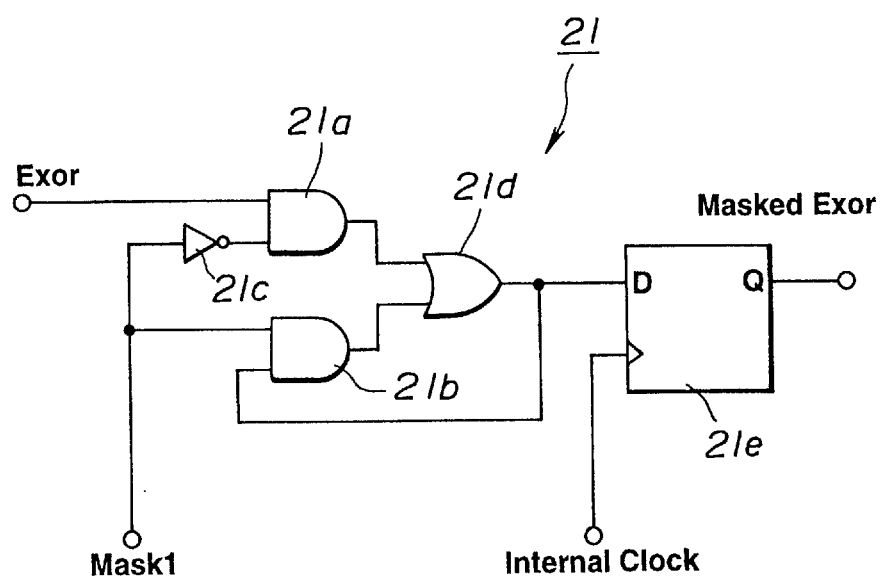
FIG. 12 is a circuit diagram showing a mask circuit provided in the logic unit.

The masking circuit 21, shown in FIG. 12, has a first AND gate 21a fed with the Exor signal having the kickback noise superimposed thereon and a first mask signal Mask1 from the inverter 21, and an OR gate 21d fed with an output of the first AND gate 21a and a second AND gate 21b. The masking circuit 21 also has the second AND gate 21b fed with the first mask signal and an output of an OR gate 21d and a D-flipflop 21e for synchronizing an output of the OR gate 21d.

The first mask signal Mask1 is formed at the current supply switching timing by a time delay circuit 23 as later explained, and has a pulse width of, for example, two internal clocks from a timing controller 27, as later explained, as shown in FIG. 8j. The D-flipflop 21e synchronizes outputs of the OR gate 21d with respect to the internal clocks.

Specifically, the masking circuit 21 holds the previous state of the Exor signal, or directly outputs the Exor signal when the first mask signal Mask1 is at a high level or at a low level, respectively. This generates a masked Exor signal, no longer containing the kickback noise, as shown in FIG. 8f. The masked Exor signal is fed to an edge detector 22 shown in FIG. 11.

The pulse width of the first mask signal Mask1 is equal to the pulse width corresponding to two internal clocks. The reason is that the kickback noise in this case is generated with a pulse width not larger than the two clock pulses. The pulse width of the first mask signal differs with the motor whose rotation is to be controlled. Thus the pulse width of the first mask signal Mask1 is preferably set in dependence upon the pulse width of the kickback noise of the motor whose rotation is to be controlled.

Figure 13:
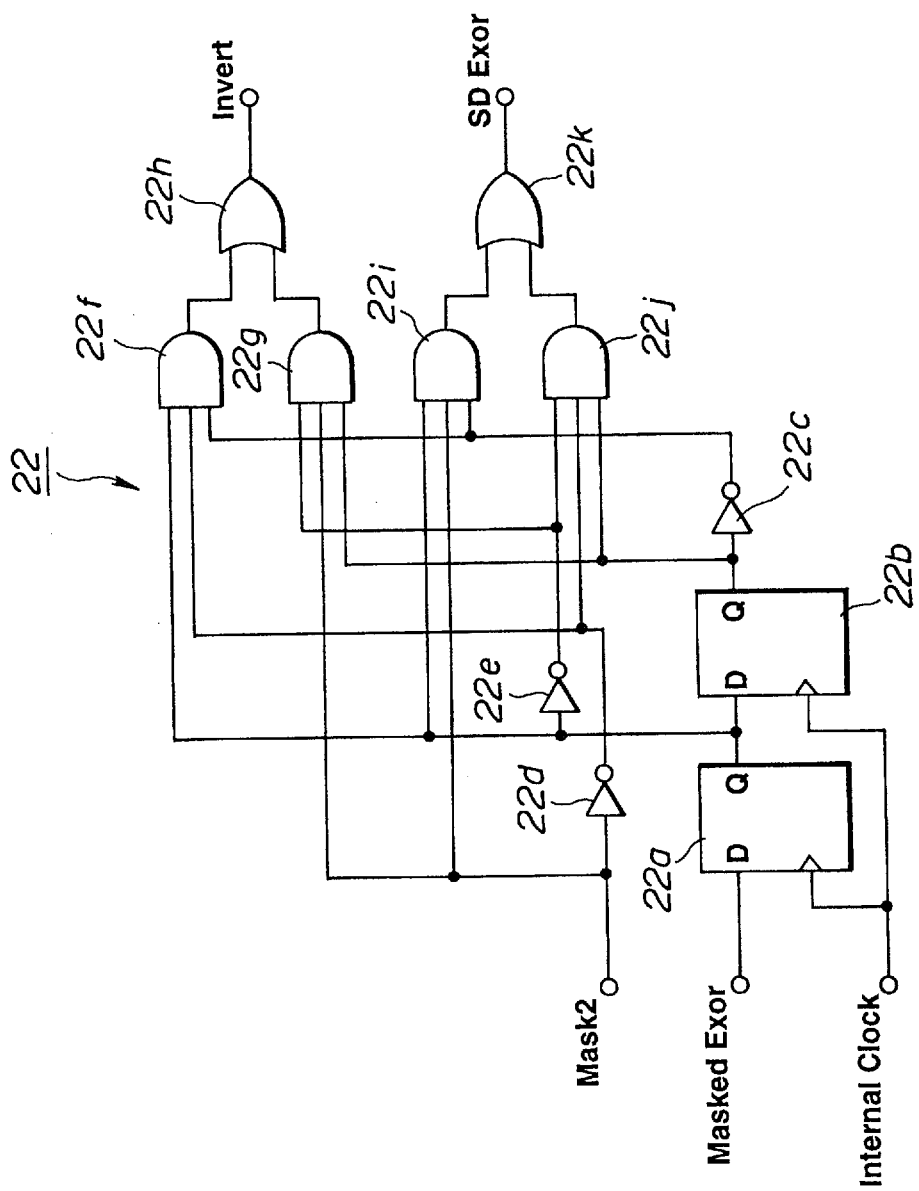
FIG. 13 is a circuit diagram showing an edge detector provided in the logic unit.

The edge detector (synchronous differentiating circuit) 22 includes a first D-flipflop 22a for synchronizing the masked Exor signals with respect to the internal clocks and a second D-flipflop 22b for re-synchronizing the masked Exor signals, synchronized by the first D-flipflop 22a, with respect to the internal clock, as shown in FIG. 13.

The edge detector 22 has a first AND gate 22f for taking a logical product of the masked Exor signal from the first D-flipflop 22a, a second mask signal Mask2 inverted in polarity by an inverter 22d as later explained and a masked Exor signal from the second D-flipflop 22c inverted in polarity by the inverter 22c, and a second AND gate 22g for taking the logical product of the masked Exor signal from the first D-flipflop 22a, inverted in polarity by the inverter 22c, the second mask signal Mask2 and the masked Exor signal from the second D-flipflop 22b. The edge detector 22 has also a first OR gate 22h for taking the logical sum of logical outputs of the first and second AND gates 22f, 22g.

The edge detector 22 has a third AND gate 22i for taking a logical product of the masked Exor signal from the first D-flipflop 22a, the second mask signal Mask2 and the mask Exor signal from second D-flipflop 22c, inverted in polarity by an inverter 22d as later explained, and a fourth AND gate 22j for taking the logical product of the masked Exor signal from the first D-flipflop 22a, inverted in polarity by the inverter 22e, the second mask signal Mask2 inverted in polarity by the inverter 22d, and the masked Exor signal from the second D-flipflop 22b. The edge detector 22 also has a second OR gate 22k for taking the logical outputs of the AND gates 22i and 22j.

The second mask signal Mask2 is formed by prediction by the decoding unit 29, as later explained, based upon the current conducting state in the phase coils 1U, 1V and 1W of the three-phase motor 1. In further detail, the three-phase motor 1 is rotationally driven by six current conducting patterns, that is a first current conduction pattern, consisting in a combination of high (H), low (L) and high (H), a second current conduction pattern, consisting in a combination of H, L and L, a third current conduction pattern, consisting in a combination of H, H and L, a fourth current conduction pattern, consisting in a combination of L, H and L, a fifth current conduction pattern, consisting in a combination of L, H and H and a sixth current conduction pattern, consisting in a combination of L, L and H, of back-electromotive voltages Ures, Vres and Wres shown in FIGS. 8k to 8m. The combinations of H, H, H and L, L, L are not employed. Thus the decoding unit 29 is able to predict the next current conduction pattern by decoding the prevailing current conduction of the back-electromotive voltages Ures, Vres and Wres. The prediction output is the above-mentioned second mask signal Mask2.

The back-electromotive voltages Ures, Vres and Wres are inverted in polarity during rotation in the usual direction and during rotation in the reverse direction. Thus the sequence of the current conduction patterns is reversed during rotation in the usual direction and during rotation in the reverse direction. Thus the edge detector 22 switches between the SD Exor signal and the Invert signal for the rotation in the usual direction and for the rotation in the reverse direction, respectively, and outputs the so-selected output.

Thus the masked Exor signal is supplied to the first flipflop 22a. Thus the first D-flipflop 22a counting the internal clocks by one, transmits the masked Exor signal to the first and third D-flipflops 22f, 22i. The first D-flipflop 22a also transmits the masked Exor signal via the inverter 22e to the second and fourth AND gates 22g, 22j. The second D-flipflop 22b, counting the internal clocks by one, transmits the masked Exor signal via the inverter 22c to the first and third D-flipflops 22f, 22i, while transmitting the same signal to the second and fourth AND gates 22g, 22j.

Thus, during rotation in the usual direction, the SD Exor signal having a pulse width corresponding to one internal clock, as shown in FIG. 8g, is formed by the second mask signal at the third and fourth AND gates 22i, 22j at the rising timing and at the decay timing of the masked Exor signal. This SD Exor signal is supplied via the second OR gate 22k to the mask circuit 21, while being also supplied to a time delay circuit 23, a starting unit 24 and to a phase locked loop (PLL) circuit 25.

During rotation in the usual direction, an inverted signal (Invert) having a pulse width corresponding to one internal clock is formed by the second mask signal Mask2 at the first and second AND gates 22f, 22g at the rising timing and at the decay timing of the masked Exor signal. This inverted signal Invert is supplied via the first OR gate 22k to a three-phase logic unit 28 as later explained.

The three-phase motor 1 is an iron-core motor, for example, and is driven by being fed with current over 120 degrees electric, as shown in FIG. 8a. For driving such iron-core motor (three-phase motor 1), the current supply is preferably advanced in phase to a slight extent for correcting the delay in the driving current due to coil inductance. Thus the time delay unit 23 delays the signal SD Exor by, for example, 30 degrees electric. The period of the signal SD Exor is 60 degrees electric, such that, if the internal clock has a frequency eight times as large as the signal SD Exor, the period of the internal clock is 60÷8 pulses=7.7 degrees. Thus, for delaying 30 degrees electric, it suffices to count four internal clocks.

Figure 14:
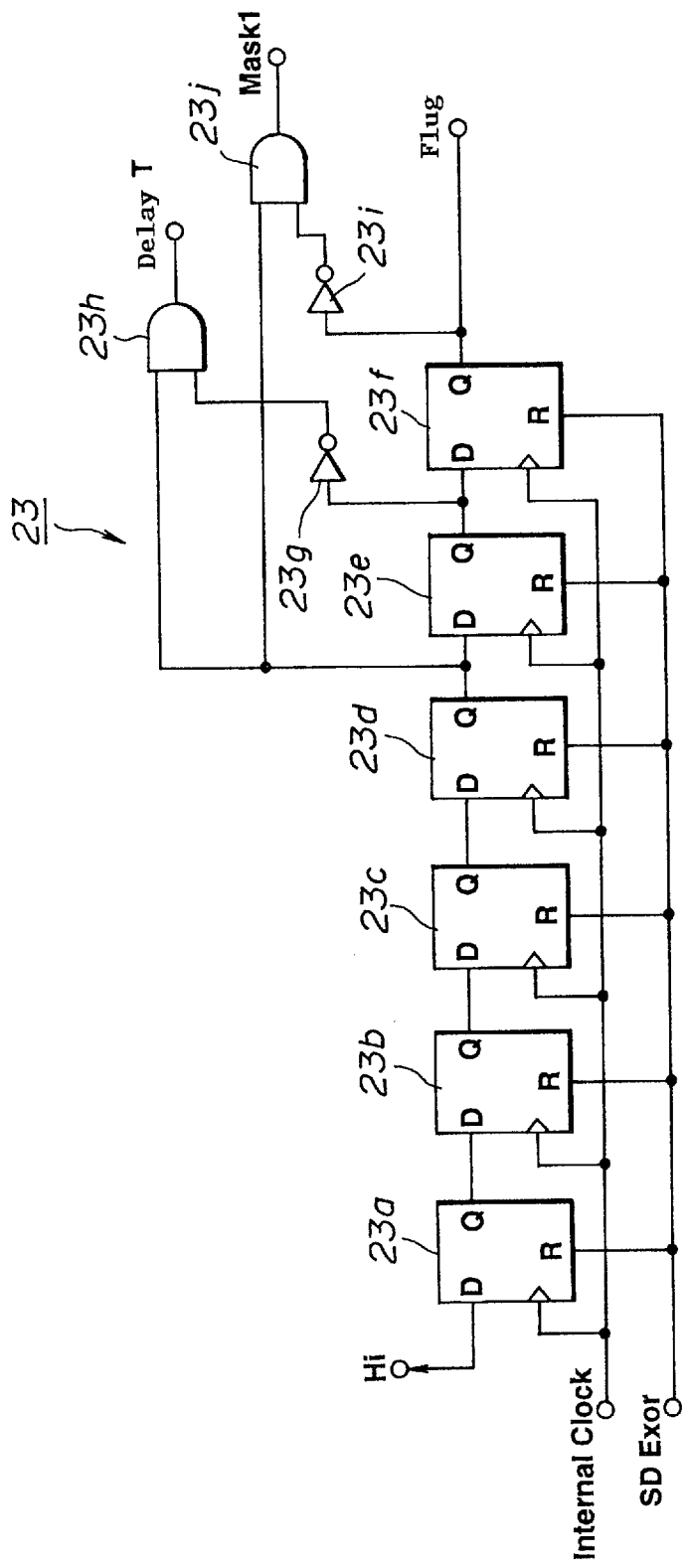
FIG. 14 is a circuit diagram showing a time delay unit provided in the logic unit.

Specifically, the time delay unit 23 is configured as shown for example in FIG. 14, in which first to sixth shift registers 23a to 23f are reset by the rising edge of the signal SD Exor for transferring a high-level signal to the next stage of the shift register for each internal clock. A first AND gate 23h is fed with an output of the fourth shift register 23d and an output of the fifth shift register 23e is inverted by an inverter 23g. Thus the first AND gate 23h forms a signal Delay T of one pulse width, at a timing of counting the signals SD Exor by four internal clocks, as shown in FIG. 8i. Since the internal clock has a period of 7.5 degrees, the signal Delay T, which is the signal SD Exor delayed by 30 degrees electric, may be formed by counting four internal clocks (FIG. 8a). This signal Delay T, which becomes high at the current supply switching timing to the phase coils U, V and W, is supplied to the three-phase logic unit 28. The signal Delay T is used in the three-phase logic unit 28 as a sampling pulse for the back-electromotive voltages Uin, Vin and Win, as will be explained subsequently.

A second AND gate 23j is fed with an output of the fourth shift register 23d and an output of the sixth shift register 23f is inverted by an inverter 23i. Thus the second AND gate 23j forms and outputs the first mask signal Mask1 having the pulse width corresponding to the two internal clocks, as shown in FIG. 8j. If the pulse width of the first mask signal is increased excessively, masking proceeds to the zero-crossing point of the back-electromotive voltage thus affecting the current supply timing for the motor. Thus, in the instant embodiment, the pulse width of the first mask signal Mask1 is set to two internal clocks, that is 15 degrees electric. The first mask signal Mask1 is fed to the mask circuit 21 so as to be used for masking the kickback noise.

In the time delay unit 23, an output of the sixth shift register 23f goes high at the same time as the first mask signal Mask1 goes low. The high-level signal is fed to the starting unit 24 as a trigger signal (signal Flug) for actuating the starter 24 now explained.

Figure 15:
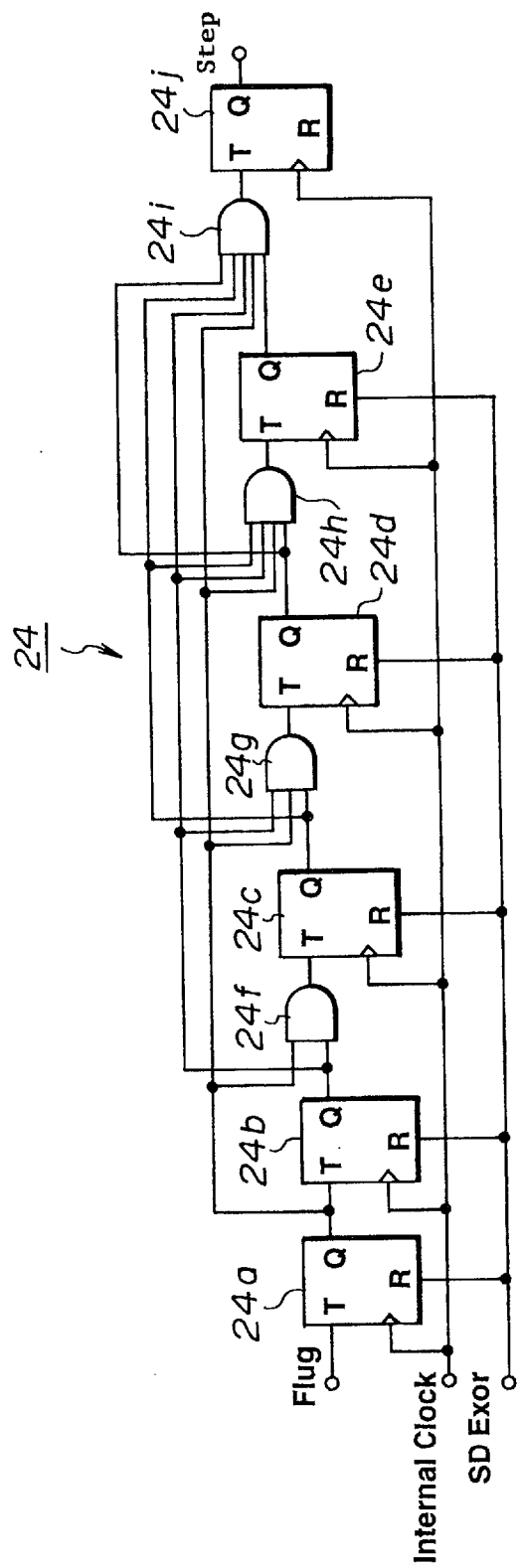
FIG. 15 is a circuit diagram showing a starter unit provided in the logic unit.

Referring to FIG. 15, the starting unit 24 includes first to fifth counters 24a to 24e reset by the signal SD Exor for counting the internal clocks, and a first AND gate 24f for taking the logical product of outputs of the first and second counters 24a, 24b for supplying the resulting signal to the third counter 24c. The starting unit 24 also includes a second AND gate 24g for taking the logical product of outputs of the first to third counters 24a to 24c for supplying the resulting signal to the fourth counter 24d. The starting unit 24 also includes a third AND gate 24h for taking the logical product of outputs of the first to fifth counters 24a to 24e for outputting the resulting signal, and a D-flipflop 24j for synchronizing an output of a fourth AND gate 24i based upon internal clocks and outputting the resulting signal as a signal Step for switching the current supplying patterns.

The signal Flug is supplied periodically to the starting unit 24 for each complete revolution of the three-phase motor 1. If, however, the current is supplied to an inappropriate phase coil, or the motor is at a standstill, the signal Flug ceases to be supplied to the starting unit 24. In such state, the current continues to be supplied to the same phase coil so that the motor cannot be started, while there is a risk of the phase coil being destroyed by being continuously fed with current. Thus the starting unit 24 is started at a timing when the high-level Flug signal is supplied, that is directly after the current supplying state is switched after sampling the back-electromotive voltage, and counts 32, for example, of the internal clocks. If the signal SD Exor is not supplied after counting 32 internal clocks, the three-phase motor 1 is deemed to be at a standstill, and a signal Step for switching to the next current conduction pattern is issued. This signal Step is supplied to the three-phase logic unit 28.

The operation of the starting unit 24 ceases when the zero-crossing point of the back-electromotive voltage is detected and the counters 24a to 24e are reset by the signal SD Exor.

The count number of the internal clocks, herein 32 counts, are set in dependence upon the torque constant of the three-phase motor 1 or the inertia operating as load. The count number may, however, be set to any arbitrary value other than the above-given value.

The three-phase logic unit 28 samples the back-electromotive voltages U, V and W, based upon the above signal Delay T, and forms the back-electromotive voltages Ures, Vres and Wres as sampled outputs, which are supplied to the decoding unit 29.

Figure 16:
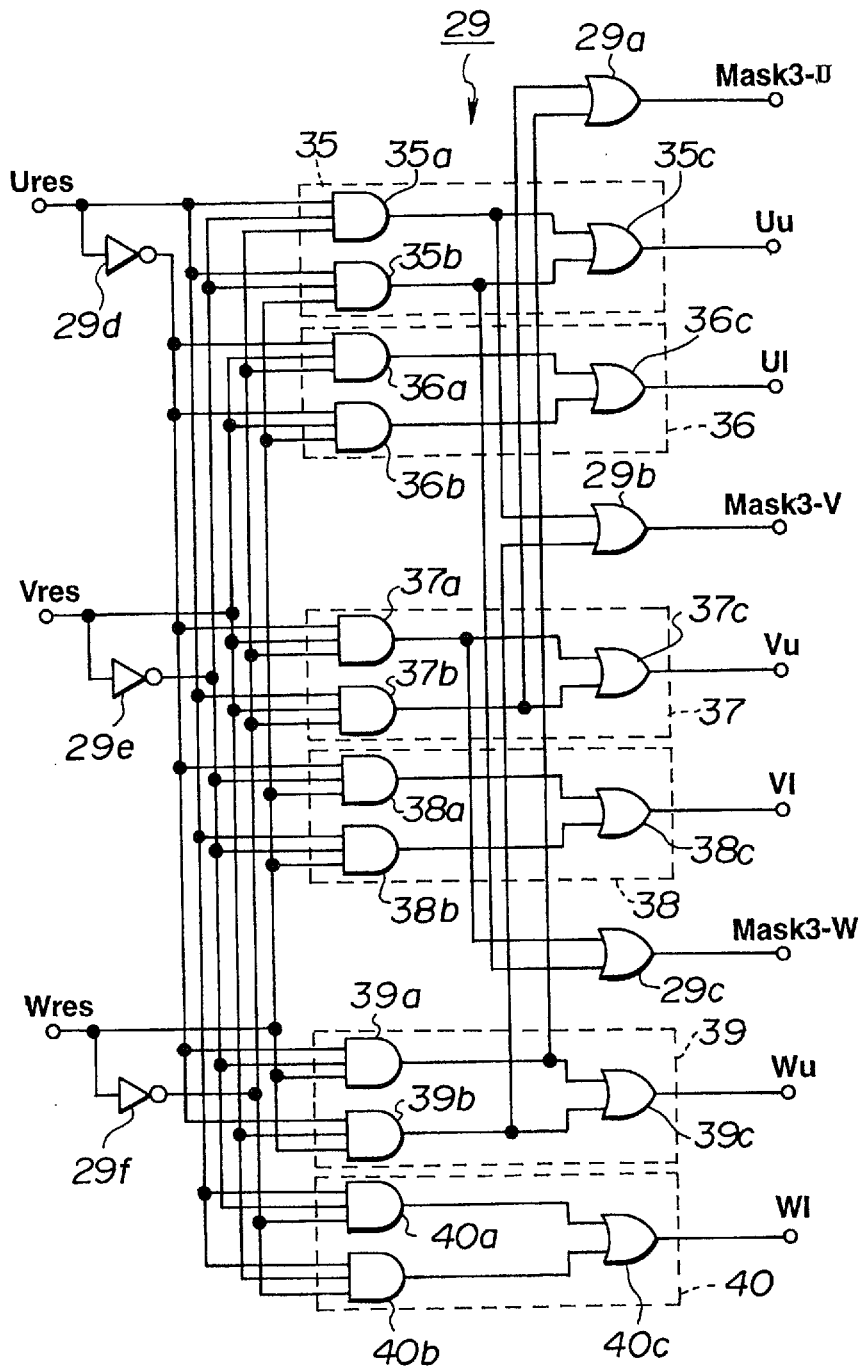
FIG. 16 is a circuit diagram showing a decoding unit provided in the logic unit.

The decoding unit 29 is configured as shown in FIG. 16, and includes a Uu signal forming unit 35 for forming a first control signal Uu for on/off control of an upper layer transistor for the U-phase coil, a Ui signal forming unit 36 for forming a second control signal Ui for on/off control of a lower layer transistor for the U-phase coil, a Vu signal forming unit 37 for forming a third control signal Vu for on/off control of an upper layer transistor for the V-phase coil, a Vi signal forming unit 38 for forming a fourth control signal Vi for on/off control of a lower layer transistor for the V-phase coil, a Wu signal forming unit 39 for forming a fifth control signal Wu for on/off control of an upper layer transistor for the W-phase coil, and a Wi signal forming unit 40 for forming a sixth control signal Wi for on/off control of a lower layer transistor for the W-phase coil. The respective transistors are provided in the driver 10 shown in FIG. 7. The decoding unit 29 includes first to third OR gates 29a to 29c for forming third mask signals Mask3-U, Mask3-V and Mask3-W for the U-, V- and W phases, respectively, which become high level signal for a pre-set period at a timing of appearance of changes in the back-electromotive voltages for the respective phases U, V and W, respectively, and first to third inverters 29d to 29f for inverting the back-electromotive voltages Ures, Vres and Wres from the three-phase logic unit 28 and outputting the inverted signals.

The Uu signal forming unit 35 has an AND gate 35a, supplied with the back-electromotive voltage Ures, the back-electromotive voltage Vres, inverted by the second inverter 29e, and the back-electromotive voltage Wres, inverted by the third inverter 29f, an AND gate 35b, supplied with the back-electromotive voltage Ures, the back-electromotive voltage Vres, inverted by the second inverter 29e, and the back-electromotive voltage Wres, and an OR gate 35c for outputting the logical sum of outputs of the AND gates 35a, 35b, as the first control signal Uu.

The Ui signal forming unit 36 has an AND gate 36a, supplied with the back-electromotive voltage Ures, inverted by the first inverter 29d, the back-electromotive voltage Vres, and the back-electromotive voltage Wres, inverted by the third inverter 29f, an AND gate 36b, supplied with the back-electromotive voltage Ures, inverted by the first inverter 29d, the back-electromotive voltage Vres and the back-electromotive voltage Wres, and an OR gate 36c for outputting the logical sum of outputs of the AND gates 36a and 36b as the second control signal Uu.

The Vu signal forming unit 37 has an AND gate 37a, supplied with the back-electromotive voltage Ures from the first inverter 29a, the back-electromotive voltage Vres and the back-electromotive voltage Wres, inverted by the third inverter 29f, an AND gate 37b, supplied with the back-electromotive voltage Ures, the back-electromotive voltage Vres and the back-electromotive voltage Wres, inverted by the third inverter 29f, and an OR gate 37c for outputting the logical sum of outputs of the AND gates 37a and 37b as the third control signal Vu.

The Vi signal forming unit 38 has an AND gate 38a, supplied with the back-electromotive voltage Ures, inverted by the first inverter 29d, the back-electromotive voltage Vres, inverted by the second inverter 29e, and the back-electromotive voltage Wres, an AND gate 38b, supplied with the back-electromotive voltage Ures, the back-electromotive voltage Vres, inverted by the second inverter 29e, and the back-electromotive voltage Wres, and an OR gate 38c for outputting the logical sum of outputs of the AND gates 38a, 38b as the fourth control signal Vi.

The Wu signal forming unit 39 has an AND gate 39a, supplied with the back-electromotive voltage Ures, inverted by the first inverter 29d, the back-electromotive voltage Vres, inverted by the second inverter 29e, and the back-electromotive voltage Wres, an AND gate 39b, supplied with the back-electromotive voltage Ures, inverted by the first inverter 29d, the back-electromotive voltage Vres, and the back-electromotive voltage Wres, and an OR gate 39c for outputting the logical sum of outputs of the AND gates 39a and 39b as the fifth control signal Wu.

The Wi signal forming unit 40 has an AND gate 40a, supplied with the back-electromotive voltage Ures, the back-electromotive voltage Vres, inverted by the second inverter 29e, and the back-electromotive voltage Wres, inverted by the third inverter 29f, an AND gate 40b, supplied with the back-electromotive voltage Ures, the back-electromotive voltage Vres, and the back-electromotive voltage Wres, inverted by the inverter 29f, and an OR gate 40c for outputting the logical sum of outputs of the AND gates 40a and 40b as the sixth control signal Wi.

The first OR gate 29a, fed with an output of the AND gate 37b of the Vu signal forming unit 37 and an output of the AND gate 39a of the Wu signal forming unit 39, takes a logical sum of the outputs for forming the third mask signal Mask3-U.

The second OR gate 29b, fed with an output of the AND gate 35a of the Uu signal forming unit 35 and an output of the AND gate 39b of the Wu signal forming unit 39, takes a logical sum of the outputs for forming the third mask signal Mask3-V.

The third OR gate 29c, fed with an output of the AND gate 37a of the Vu signal forming unit 37 and an output of the AND gate 35b of the Uu signal forming unit 35, takes a logical sum of the outputs for forming the third mask signal Mask3-W.

The above-described decoding unit 29 forms first to sixth control signals Uu to Wi for on/off control of the upper and lower layer transistors of the respective phases, based upon the above-described first to sixth current supplying patterns of the back-electromotive voltages Ures, Vres and Wres.

That is, if the back-electromotive voltages Ures, Vres and Wres supplied to the decoding unit 29 are of the first current supplying pattern (H, L, H) and the second current supplying pattern (H, L, L) shown in FIGS. 8k to 8m, the Uu signal forming unit 35 outputs the first control signal Uu, which is at high level during this time, as shown in FIG. 8r.

Similarly, if the back-electromotive voltages Ures, Vres and Wres supplied to the decoding unit 29 are of the fourth current supplying pattern (L, H, L) and the fifth current supplying pattern (L, H, H) shown in FIGS. 8k to 8m, the Ui signal forming unit 36 outputs the second control signal Ui, which is at high level during this time, as shown in FIG. 8s.

If the back-electromotive voltages Ures, Vres and Wres supplied to the decoding unit 29 are of the third current supplying pattern (H, H, L) and the fourth current supplying pattern (L, H, L) shown in FIGS. 8k to 8m, the Vu signal forming unit 37 outputs the third control signal Vu, which is at high level during this time, as shown in FIG. 8t. If the back-electromotive voltages Ures, Vres and Wres supplied to the decoding unit 29 are of the first current supplying pattern (H, L, H) and the sixth current supplying pattern (L, L, H) shown in FIGS. 8k to 8m, the Vi signal forming unit 38 outputs the fourth control signal Vi, which is at high level during this time, as shown in FIG. 8u.

If the back-electromotive voltages Ures, Vres and Wres supplied to the decoding unit 29 are of the fifth current supplying pattern (L, H, H) and the sixth current supplying pattern (L, L, H) shown in FIGS. 8k to 8m, the Wu signal forming unit 39 outputs the fifth control signal Wu, which is at high level during this time, as shown in FIG. 8v. If the back-electromotive voltages Ures, Vres and Wres supplied to the decoding unit 29 are of the second current supplying pattern (H, L, L) and the third current supplying pattern (H, H, L) shown in FIGS. 8k to 8m, the Wi signal forming unit 40 outputs the sixth control signal Vi, which is at high level during this time, as shown in FIG. 8w.

The control signals Uu to Wi, thus formed, are supplied to an output controller 30, which will be explained subsequently.

The first OR gate 29a takes a logical sum of an output of the AND gate 37b of the Vu signal forming unit 37 and an output of the AND gate 39a of the Wu signal forming unit 39 for forming a third mask signal Mask3-U which goes high for a pre-set period at the change timing of the back-electromotive voltage Ures as shown in FIG. 8o. This third mask signal is fed to the three-phase logic unit 28.

The second OR gate 29b takes a logical sum of an output of the AND gate 35a of the Uu signal forming unit 35 and an output of the AND gate 39b of the Wu signal forming unit 39 for forming a third mask signal Mask3-V which goes high for a pre-set period at the change timing of the back-electromotive voltage Ures as shown in FIG. 8p. This third mask signal is fed to the three-phase logic unit 28.

The third OR gate 29c takes a logical sum of an output of the AND gate 37a of the Vu signal forming unit 37 and an output of the AND gate 35b of the Uu signal forming unit 35 for forming a third mask signal Mask3-W as shown in FIG. 8p. This third mask signal is fed to the three-phase logic unit 28.

Thus the OR gates 29a to 29c predict which one of the edges of the back-electromotive voltages Ures, Vres and Wres is oncoming next based upon the current supplying patterns and send the predicted edge as the third mask signal (Mask3-U, Mask3-V or Mask3-W) to the phase logic unit 28.

Figure 17:
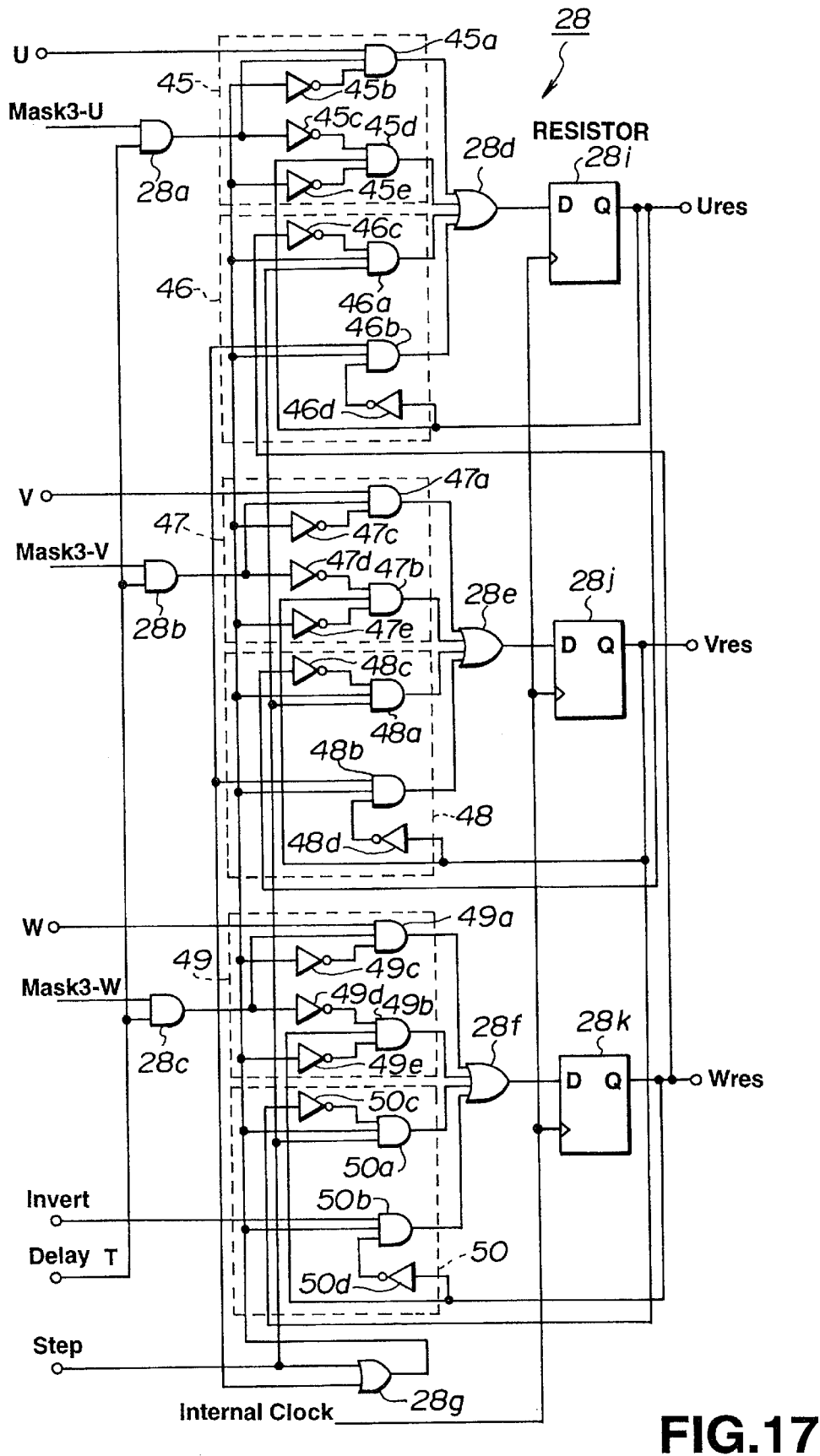
FIG. 17 is a circuit diagram showing a timing controller provided in the logic unit.

Referring next to FIG. 17, the three-phase logic unit 28 has a U-sampling circuit 45 for sampling the back-electromotive voltage U among the back-electromotive voltages U, V and W as the comparison outputs of the comparator 2 shown in FIG. 7, and a register 28i for U for holding the back-electromotive voltage U sampled by the U-sampling circuit 45. The three-phase logic circuit 28 also includes a register control circuit 46 for U for inverting the contents of the register 28i for U by an inversion signal Invert from the edge detector 22 on detection of the reverse rotation of the three-phase motor 1 or stepping the current supplying pattern for the register 28i for U as the next current supplying pattern by the step signal Step from the starting unit 24 in case of failure of rotor rotation.

The three-phase logic unit 28 includes a V-sampling circuit 47 for sampling the back-electromotive voltage V, and a register 28j for V for holding the back-electromotive voltage V sampled by the V sampling circuit 47. The three-phase logic unit 28 also includes a register control circuit 48 for V for inverting the contents of the register 28j for V by the inversion signal (Invert) on detection of the reverse rotation of the three-phase motor 1 or stepping the current supplying pattern for the register 28j for V as the next current supplying pattern by the step signal Step in case of failure of rotor rotation.

The three-phase logic unit 28 also includes a W-sampling circuit 49 for sampling the back-electromotive voltage W, and a register 28k for W for holding the back-electromotive voltage W sampled by the W sampling circuit 49. The three-phase logic unit 28 also includes a register control circuit 50 for W for inverting the contents of the register 28k for W by the inversion signal (Invert) on detection of the reverse rotation of the three-phase motor 1 or stepping the current supplying pattern for the register 28k for U as the next current supplying pattern by the step signal Step in case of failure of rotor rotation.

The three-phase logic unit 28 also includes a first AND gate 28a for timing control of sampling by the U sampling circuit 45 based upon the third mask signal (Mask3-U) from the decoding unit 29 and the signal Delay T from the time delay unit 23, and a second AND gate 28b for timing control of sampling by the V sampling circuit 47 based upon the third mask signal (Mask3-V) from the decoding unit 29 and the signal Delay T. The three-phase logic unit 28 also includes a third AND gate 28c for timing control of sampling in the W sampling circuit 49 based upon the third mask signal (Mask3-W) from the decoding unit 29 and the signal Delay T, and an OR gate 28g for controlling the stepping of the register control circuits 46, 48 and 50.

The sampling circuit 45 includes an AND gate 45a, fed with the back-electromotive voltage U, an output of the first AND gate 28a and an inverted output of the OR gate 28g from the inverter 45c, and an AND gate 45d fed with an inverted output of the first AND gate 28a from the inverter 45c, an output of the register 28i for U and an inverted output of the OR gate 28g from the inverter 45e.

The register control circuit 46 for U includes an inverted output of the register 28k for W from the inverter 46c, an output of the OR gate 28g and the above signal Step, and an AND gate 46b fed with the output of the OR gate 28g and the inverted output of the register 28i for U from the inverter 46d.

The sampling circuit 47 includes an AND gate 47a, fed with the back-electromotive voltage V, an output of the second AND gate 28b and an inverted output of the OR gate 28g from the inverter 45c, and an AND gate 47d fed with an inverted output of the second AND gate 28b from the inverter 45d, an output of the register 28j for V and an inverted output of the OR gate 28g from the inverter 47e.

The register control circuit 48 for V includes an AND gate 48a fed with an inverted output of the register 28i for U from the inverter 48c, an output of the OR gate 28g and the above signal Step, and an AND gate 48b fed with the signal Invert, the output of the OR gate 28g and the inverted output of the register 28k for V 28j from the inverter 48d.

The sampling circuit 49 includes an AND gate 49a, fed with the back-electromotive voltage W, an output of the third AND gate 28c and an inverted output of the OR gate 28g from the inverter 49c, and an AND gate 49d fed with the inverted output of the third AND gate 28 via the inverter 49d, an output of the register 28k for W and an inverted output of the OR gate 28g via the inverter 49e.

The register control circuit 50 for W includes an AND gate 50a fed with inverted output of the register 28j for V from the inverter 50c, an output of the OR gate 28g and the above signal Step, and an AND gate 50b fed with the signal Invert, output of the OR gate 28g and the inverted output of the register 28k for W from the inverter 50d.

The three-phase logic unit 28 also includes a first OR gate 28d for taking the logical sum of outputs of the AND gates 45a, 45b of the U sampling circuit 45 and outputs of the AND gates 46a and 46b of the register control circuit 46 for U for supplying the resulting signal to the register 28i for U, and a second OR gate 28e for taking the logical sum of outputs of the AND gates 47a, 47b of the V sampling circuit 47 and outputs of the AND gates 48a, 48b of the register control circuit 48 for V for supplying the resulting signal to the register 28j for V. The three-phase logic unit 28 also includes a third OR gate 28f for taking the logical sum of outputs of the AND gates 49a, 49b of the W sampling circuit 49 and outputs of the AND gates 50a, 50b of the register control circuit 50 for W for supplying the resulting signal to the register 28k for W.

The above-described three-phase logic unit 28 samples, by the sampling circuit 49, the back-electromotive voltages U, V and W at a timing of coincidence of the signal Delay T delayed by 30 degrees electric, as shown in FIG. 8i, and the third masking signals (Mask3-U, Mask3-V and Mask3-W) shown in FIG. 8o to 8q, and transmits the resulting sampled signals to the registers 28i to 28k via OR gates 28d to 28f. This enables only the back-electromotive voltage of the phase coil which has undergone changes. The back-electromotive voltages of the remaining phase coils are held by the registers 28i to 28k. Thus the registers 28i to 28k directly output the back-electromotive voltages Ures, Vres and Wres, that is the sampled outputs of the back-electromotive voltages U, V and W held thereby as shown in FIGS. 8k and 8m, unless the signal Invert or the signal Step as later explained is supplied.

If the capturing of the back-electromotive voltages U, V and W is carried out at the zero-crossing point with the common voltage COM, there arises such inconvenience that, if the value of the back-electromotive voltage is small as at the time of motor start-up or during low speed rotation, an incorrect phase coil is fed with current such that the motor cannot be started or the rpm of the motor is decreased to halt the motor rotation. With the present motor driving apparatus, the back-electromotive voltages U, V and W are captured by the signal Delay T at a timing delayed by 30 degrees electric from the zero-crossing point so that the back-electromotive voltages U, V and W can be captured correctly.

Next, if the inappropriate phase coil is fed with current or the motor rotation ceases, the signal Flug is not supplied to the starting unit 24 as described above, 32 of the internal clocks are counted by the counters 24a to 24e of the starting unit 24 so that the signal Step for stepping to the next current supplying pattern is issued.

When fed with the signal Step, the three-phase logic unit 28 has the register control circuits 46, 48 and 50 set to the operating state so that an inverted signal from the register 28k for W is supplied from the register control circuit 46 for U via the inverter 46c to the register 28i for U so that an inverted output of the register for U is supplied from the register control circuit 48 for V to the register 28j for V while an inverted output of the register 28j from the inverter 50c is supplied from the register control circuit 50 for W to the register 28k for W.

Thus the output of each of the registers 20i to 28k may be stepped to an output of the next current supplying pattern. This stepping is continued until the three-phase motor 1 is started and the signal Step ceases to be supplied. This enables motor rotation to be started reliably on start-up for improving starting characteristics.

If the rotation in a rotational direction reversed from the usual rotational direction is detected by the edge detector 22, the signal Invert is issued. When fed with the signal Invert, the three-phase logic unit 28 has the register control circuits 46, 48 and 50 set to the operating state so that an inverted signal from the register 28i for U is supplied via the inverter 46d to the register 28i for U so that an inverted output of the register 28j for V is supplied via the inverter 48d to the register 28j and an inverted output of the register 28k for W is sent via the inverter 50d to the register 28k for W.

This enables outputs of the registers 28i to 28k to be inverted in their entirety into those for rotation in the reverse direction and outputted in the inverted state. Heretofore, a comparison output of the detected back-electromotive voltages and the common voltage COM is simply outputted on inversion so that correct current supply timing cannot be achieved reliably. With the present motor driving apparatus, the respective back-electromotive voltages are sampled at a timing delayed by 30 degrees electric from the zero-crossing point by the signal Delay T, so that the respective back-electromotive voltages can be sampled at correct timings and held by the registers 28i to 28k during rotation in the reverse direction. Since the contents of the registers 28i to 28k may be inverted in polarity and outputted as inverted signals during the rotation in the reverse direction based upon the signal Invert, the back-electromotive voltages Ures, Vres and Wres detected at correct timings during rotation in the reverse direction may be outputted so that the three-phase motor 1 can be controlled at the correct current supply timing during the reverse rotation.

The back-electromotive voltages Ures, Vres and Wres, formed by the three-phase logic unit 28, are supplied to the decoding unit 29 where they are separated into the first to sixth control signals Uu to Wi for on-off control of the upper and lower layer transistors of the respective phases. The resulting control signals are routed to the output controller 30.

Referring to FIG. 11, the timing controller 27 forms various timing signals based upon the reversing signal Reverse from the full-wave rectifying circuit 3, motor on-off control signals (M ON/OFF) formed by the central processing unit (CPU) for on-off motor control, system clocks from the PLL circuit 25 (signal PLL Out), main clocks of, for example, 500 kHz, from an oscillator 26 (Main Clock) and the PWM signal from the PWM circuit 7 (PWM in).

Figure 18:
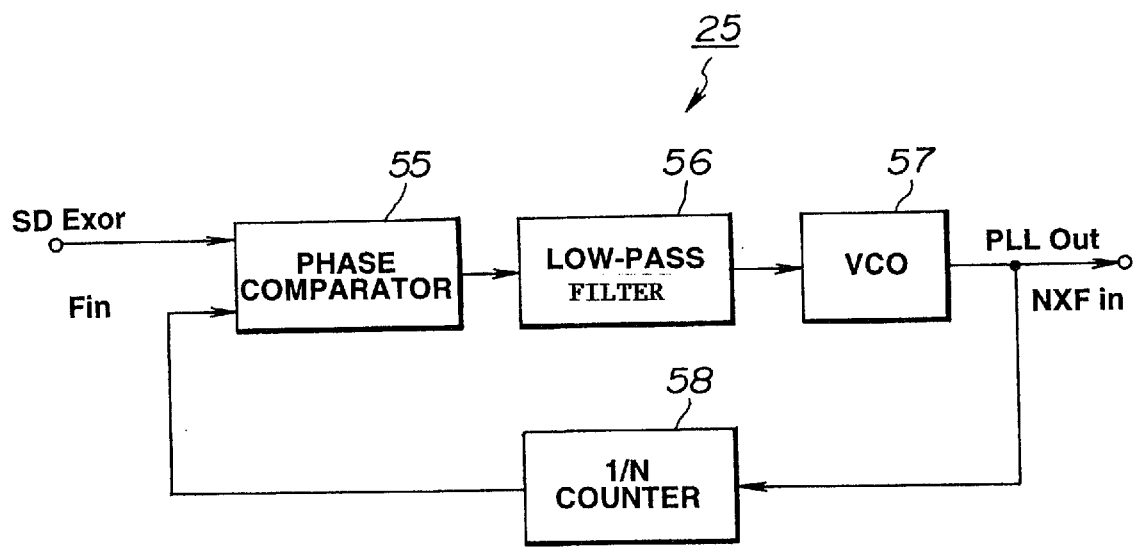
FIG. 18 is a circuit diagram showing a PLL circuit provided in the logic unit.

The PLL circuit 25 is configured as shown for example in FIG. 18, and compares by a phase comparator 55 the phase of the signal SD Exor supplied from the edge detector 22 and the phase of the system clock (signal PLL Out) outputted from the voltage controlled oscillator (VCO) 57 and divided in frequency by a divide-by-N counter 58 into a frequency which is one-eighth or one-sixteenth of the system clock frequency. The phase comparison output is fed via a low-pass filter 56 to the VCO 57 for driving the VCO 57 into oscillation. This generates the signal PLL Out synchronized with the signal SD Exor which is supplied to the timing controller 27.

Figure 19:
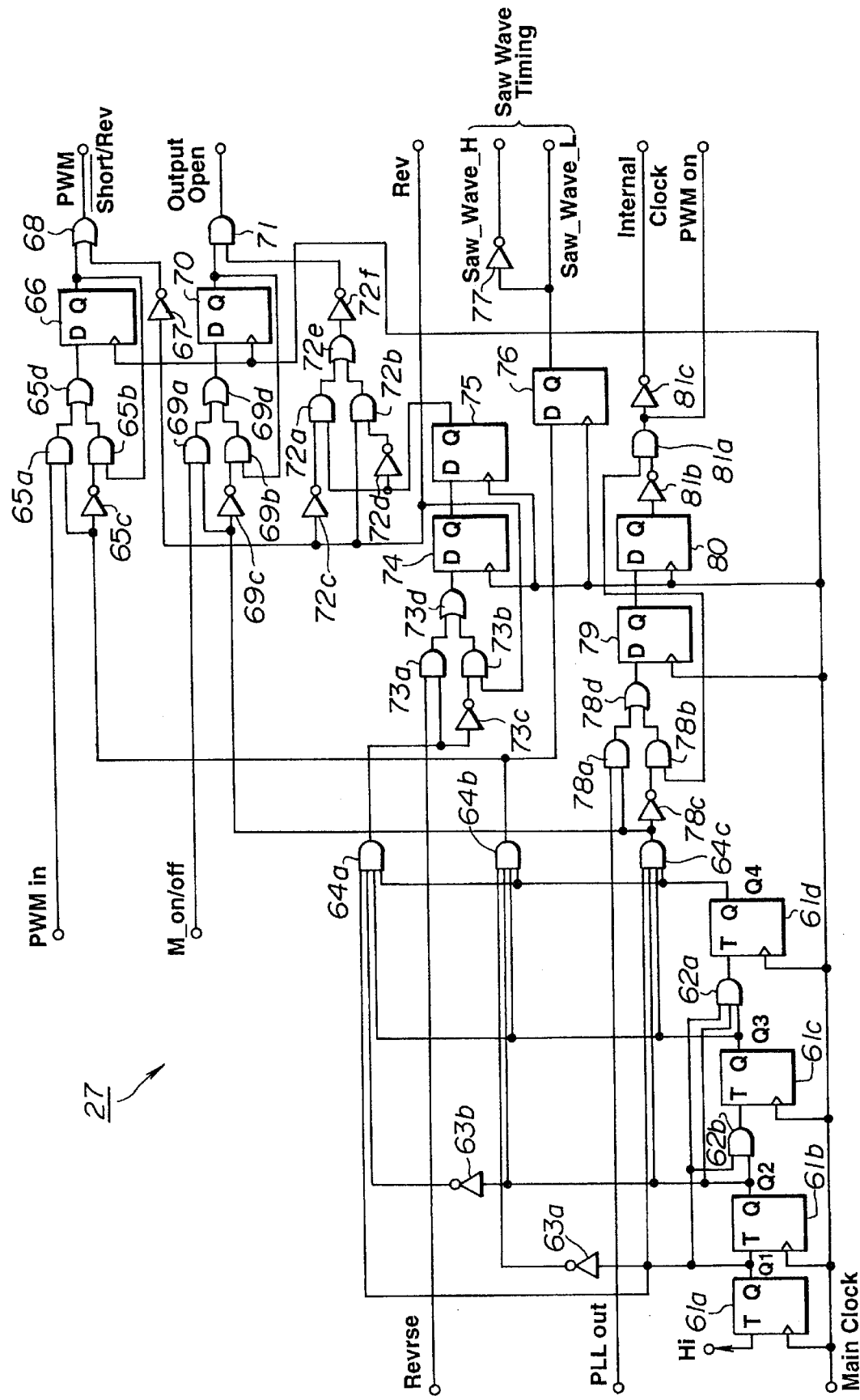
FIG. 19 is a circuit diagram showing a timing controller provided in the logic unit.

Referring to FIG. 19 the timing controller 27 includes a first counter 61a for counting two main clocks of the oscillator 26, and a second counter 61b for counting two count outputs Q1 from the first counter 61a. The timing controller 27 also includes an AND gate 62a for taking a logical product of a count output Q1 of the first counter 61a and a count output Q2 of the second counter 61b, and a third counter 61c for counting two outputs of the AND gate 62. The timing controller also includes an AND gate 62b for taking a logical product of the count outputs Q1, Q2 and a count output Q3 of the third counter 61c and a fourth counter 61d for counting two outputs of the AND gate 62b for outputting a count output Q4. The counters 61a to 61d make up a base-16 counter such that the ultimate counter output Q4 has a frequency which is one-sixteenth of the main clock frequency.

The timing controller 27 has an AND gate 64a for taking a logical product of the count output Q1, the count output Q2 inverted by an inverter 63a, and the count outputs Q3 and Q4, an AND gate 64b for taking a logical output of the count output Q1 inverted by the inverter 63b and the count outputs Q2 to Q4 and an AND gate 64c for taking a logical product of the count outputs Q1 to Q4.

The timing controller 27 includes an AND gate 65a for taking a logical product of the PWM signal (PWM in) from the PWM circuit 7 and an output of the AND gate 64b and an AND gate 65b for taking a logical product of the output of the AND gate 64b inverted by the inverter 65c and the output of a D-flipflop 66. The timing controller 27 also includes an OR gate 65d for taking a logical sum of the AND gates 65a and 65b and a D-flipflop 66 for synchronizing outputs of the OR gate 65 to the main clocks. The timing controller 27 also includes an OR gate 68 for taking a logical sum of an output of the D-flipflop 66 and the signal Rev for current supply in the reverse direction, formed in the D-flipflop 74 based upon the reversing signal Rev from the full-wave rectifying circuit 3 for forming and outputting a braking switching signal (PWM inversion Short/Rev) for switching between short braking and reverse current supplying braking as later explained.

The timing controller 27 includes an AND gate 69a for taking a logical product of the motor on-off control signal (M ON/OFF) and the output of the AND gate 64c, and an AND gate 69b for talking a logical product of the output of the AND gate 64c inverted by the inverter 69c and the output of the D-flipflop 70. The timing controller 27 also includes an OR gate 69d for taking a logical sum of outputs of the AND gates 69a, 69b, and a D-flipflop 70 for synchronizing outputs of the OR gate 69d to the main clocks. The timing controller 27 also includes an AND gate 71 for taking the logical product of an output of the D-flipflop 70 and an inverted output of an inverter 72f for forming and outputting an output open signal for preventing through-current as later explained.

The timing controller 27 also has an AND gate 72a for taking a logical product of the reversing signal Rev from the D-flipflop 74, inverted by the inverter 72c, and an output of the D-flipflop 75, and an AND gate 72b for taking the logical product of the reversing signal Rev from the D-flipflop 74 and an output of the D-flipflop 75 inverted by the inverter 72d. The timing controller 27 also has an OR gate 72e for taking a logical sum of outputs of the AND gates 72a and 72b and an inverter 72f for inverting an output of the OR gate 72e for supplying the inverted output to the AND gate 71.

The timing controller 27 also has an AND gate 73a for taking a logical product of the reversing signal supplied from the full-wave rectifying circuit 3 and an output of the AND gate 73a, and an AND gate 73b for taking a logical product of the output of the AND gate 64a inverted by the inverter 73c and the reversing signal Rev. The timing controller 27 also has an OR gate 73d for taking the logical product of outputs of the AND gates 73a and 73b and a D-flipflop 74 for synchronizing outputs of the OR gate 73d to the main clocks for generating the reversing signal Rev, and a D-flipflop 75 for synchronizing the signal Rev from the D-flipflop 74 to the main clocks.

The timing controller 27 also has a D-flipflop 76 for synchronizing outputs of the AND gate 64b to the main clocks for forming a signal Saw Wave L and an inverter 77 for inverting the signal Saw Wave L from the D-flipflop 76 for forming and outputting a signal Saw Wave H. These signals Saw Wave L and Saw Wave H are supplied to the PWM circuit 7.

The timing controller 27 also has an AND gate 78a for taking a logical product of the signal PLL Out from the PLL circuit 25 and an output of the AND gate 64, and an AND gate 78b for taking a logical product of the output of the AND gate 64c inverted by the inverter 78c and an output of the D-flipflop 79. The timing controller 27 also has an OR gate 78d for taking the logical sum of outputs of the AND gates 78a, 78b and a D-flipflop 79 for synchronizing outputs of the OR gate 78d to the main clock.

In addition, the timing controller 27 has a D-flipflop 80 for synchronizing outputs of the D-flipflop 79 with respect to main clocks, and an AND gate 81a for taking a logical product of an output of the D-flipflop 79 and an output of the D-flipflop 80 inverted by the inverter 81b for forming and outputting a signal PWM On for detecting the back-electromotive force. The timing controller 27 also has an inverter 81c for inverting the signal PWM On from the AND gate 81a for forming and outputting an internal clock.

Figure 20:
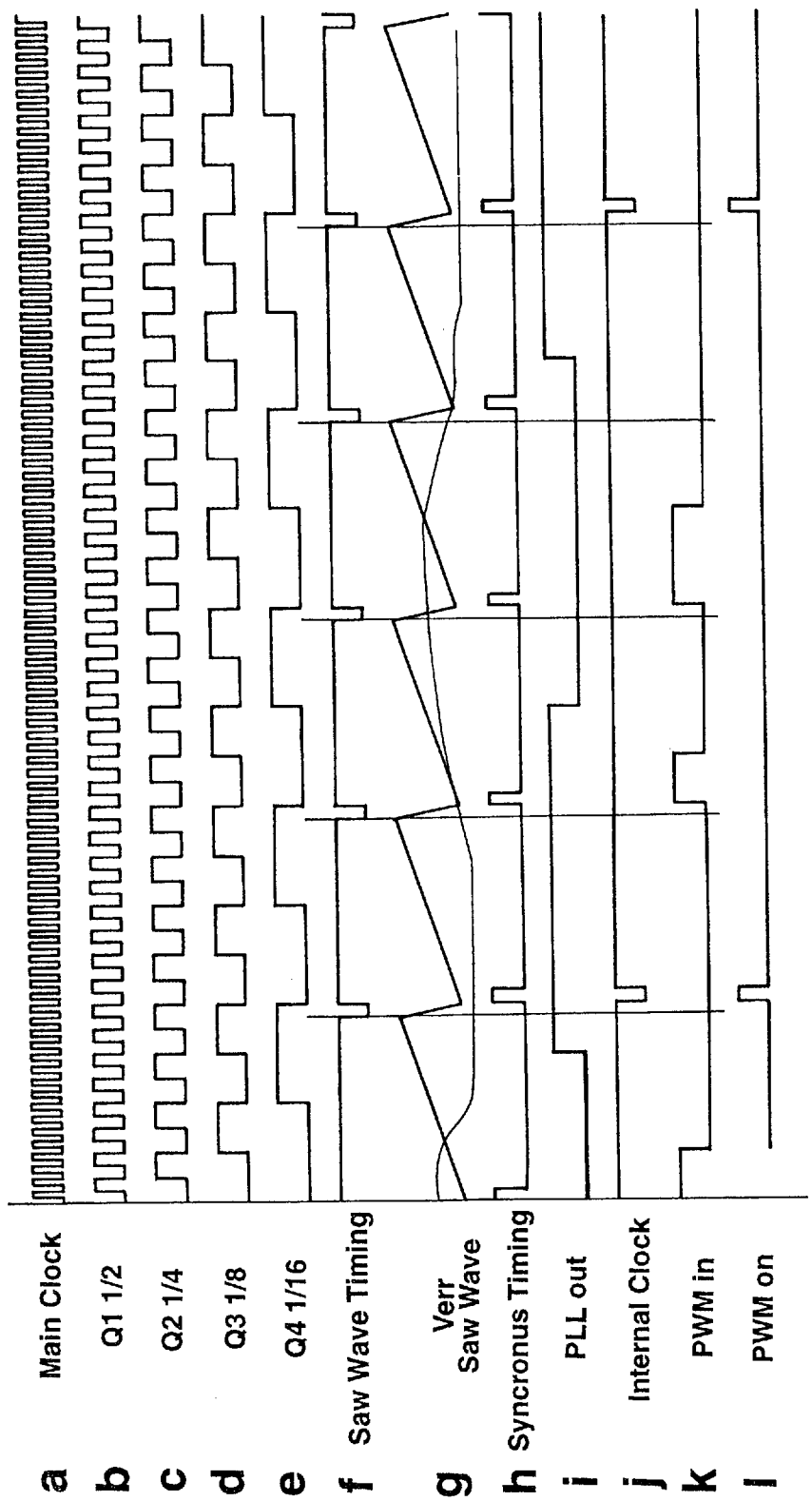
FIG. 20 is a timing chart for illustrating the detection timing for detecting the back-electromotive force during PWM control of the motor driving apparatus shown in FIG. 7.

With the above-described arrangement of the timing controller 27, when main clocks shown in FIG. 20a are supplied to the first counter 61a, the counter 61a counts two of the main clocks to form the count output Q1 whose frequency is one-half the frequency of the main clocks, as shown in FIG. 8b. The count Q1 is fed to the second counter 61b, which then counts two of the outputs Q1 to form the count output Q2 whose frequency is one fourth the frequency of the main clocks, as shown in FIG. 8c. The count output Q2 is fed via the AND gate 62a to the third counter 61c, which then counts two of the count outputs Q2 to form the count output Q3 whose frequency is one eighth the frequency of the main clocks shown in FIG. 8d. The count output Q3 is supplied via the AND gate 62b to the fourth counter 61d, which then counts two of the count outputs Q3 to form the count output Q4 whose frequency is one sixteenth the frequency of the main clocks, as shown in FIG. 8e. These count outputs Q1 to Q4 are fed to the AND gate 64c. The count output Q1 is inverted by the inverter 63 and thence supplied to the AND gate 64b. The remaining count outputs Q3 and Q4 are directly fed to the AND gate 64b.

By frequency-dividing the main clocks using the first to fourth counters 61a to 61d, the count outputs Q1 to Q4 having different frequencies synchronized with the main clocks may be produced, thus readily producing the desired timings synchronized with the main clocks.

The AND gate 64b takes a logical product of the count output Q1, inverted by the inverter 63, and the count outputs Q3 and Q4, and sends the resulting signal to the D-flipflop 76. The D-flipflop 76 synchronizes outputs of the AND gate 64b with respect to the main clocks for outputting the signal Saw Wave L at a timing when the output of the AND gate 64b goes low. The signal Saw Wave L is then routed to the inverter 77. The inverter 77 inverts the signal Saw Wave L to output the signal Saw Wave H at a timing when the output of the AND gate 64b goes high. The signals Saw Wave L and Saw Wave H are supplied as a signal Saw Wave Timing having a decay width of one main clock from the decay edge of the count output Q4 shown in FIG. 20f to the PWM circuit 7 shown in FIG. 1.

Figure 4:
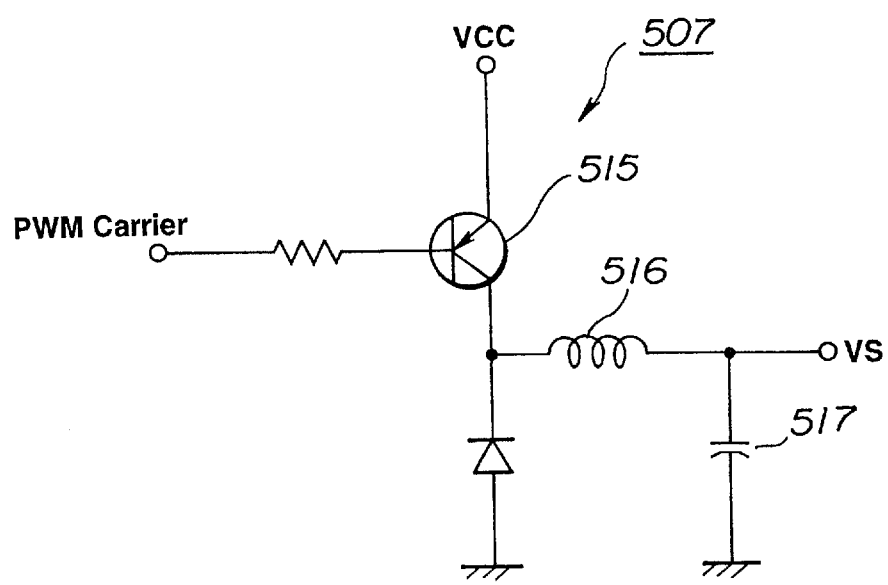
FIG. 4 is a circuit diagram of a voltage conversion circuit provided in the conventional motor driving apparatus.
Figure 5:
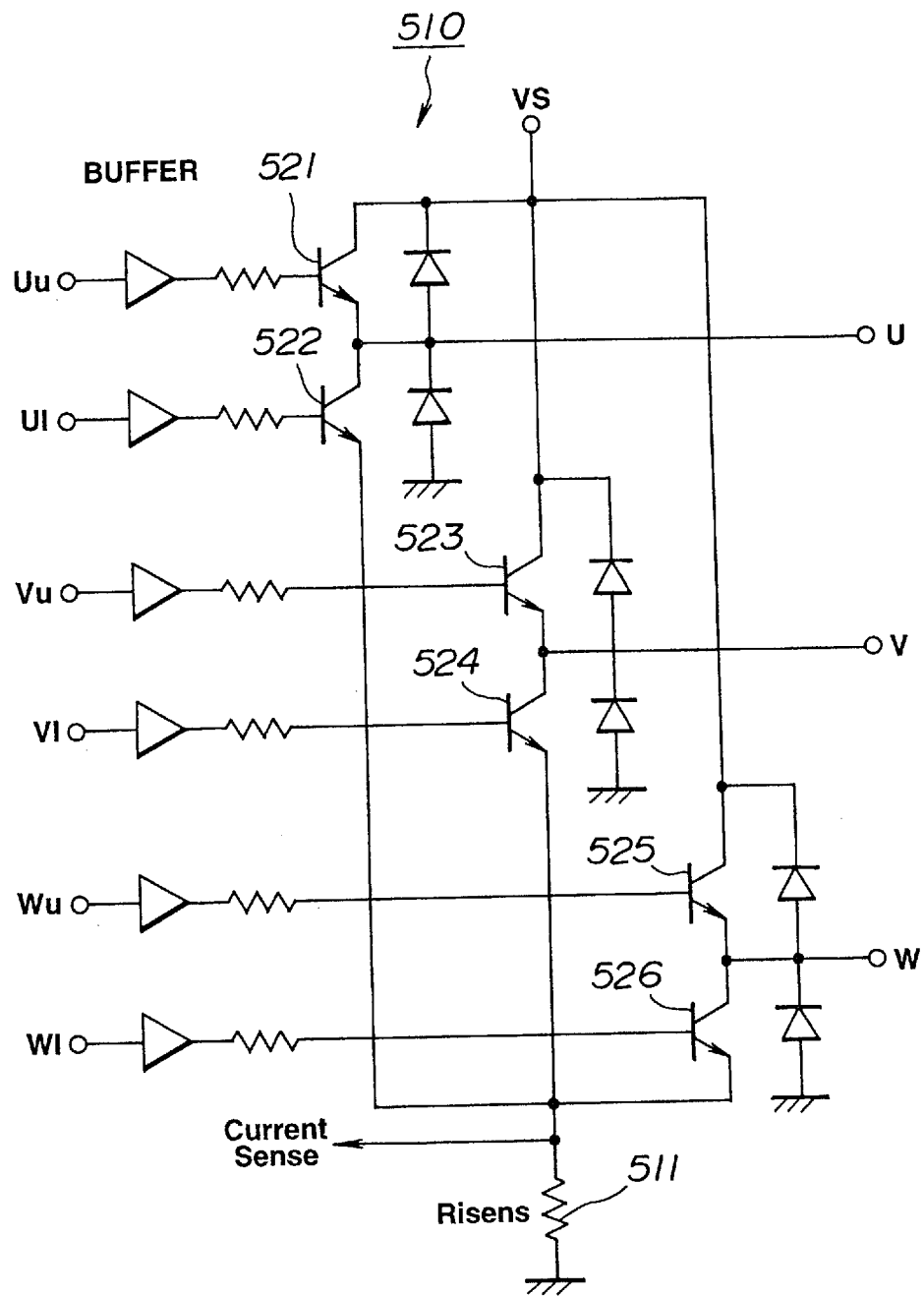
FIG. 5 is a circuit diagram of a driving unit provided in the conventional motor driving apparatus.
Figure 6:
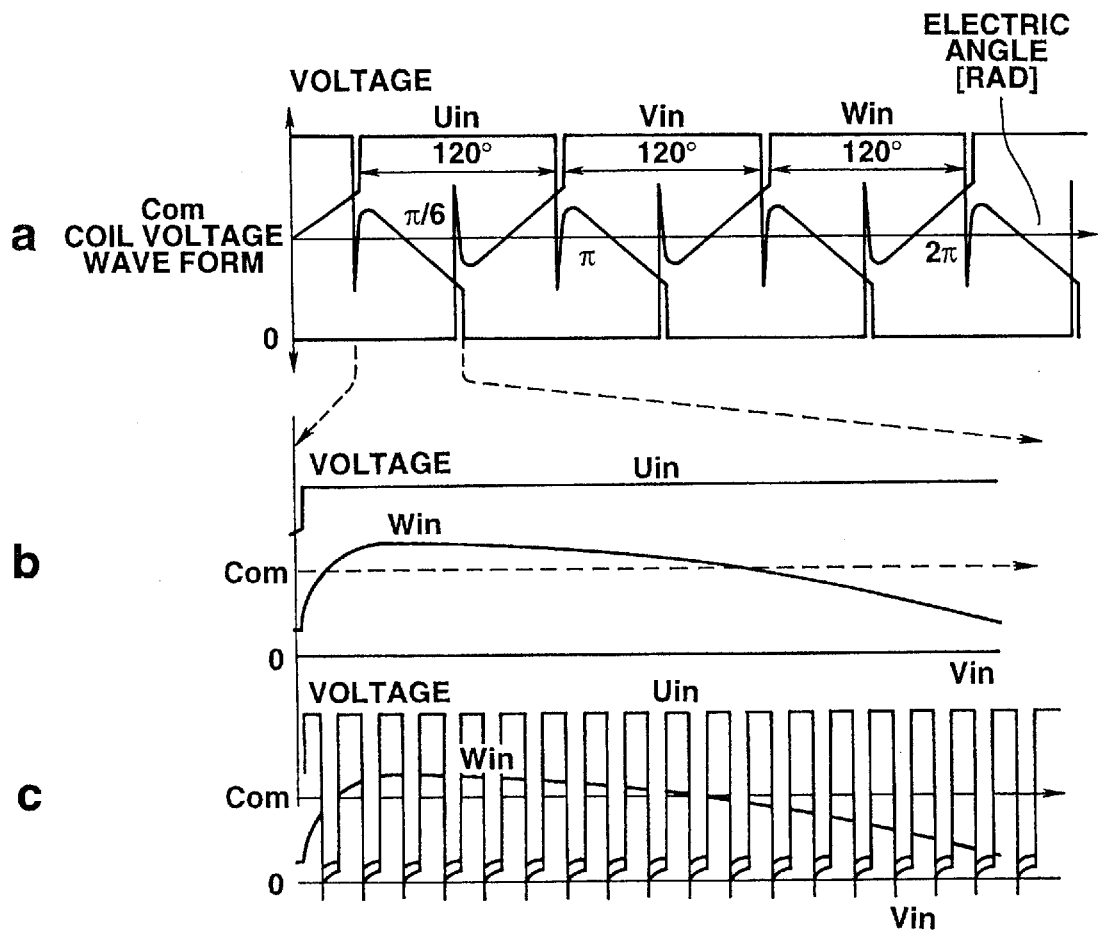
FIG. 6 is a timing chart for illustrating a reason the direct PWM driving cannot be achieved with the conventional motor driving apparatus.

The PWM circuit 7 has a saw wave generating portion therein and generates, on being supplied with the signal Saw Wave Timing, saw waves which become serrated between pulse widths of the signal Saw Wave Timing as shown in FIG. 20g. The frequency of the saw waves has a period equal to one sixteenth of the main clock period. The PWM circuit 7 compares the saw waves and the comparison output Verr from the comparator 4, as shown in FIG. 4g, and sends the results of comparison as a signal PWM In shown in FIG. 20k to the output controller 30 shown in FIG. 11 and to the AND gate 65a shown in FIG. 11. The operation of comparison by the PWM circuit 7 indicates that the comparison output Verr is being modulated by PWM by the signal Saw Wave Timing.

The AND gate 64c takes the logical product of the count outputs Q1 to Q4 to form and output a synchronous timing signal Synchronous Timing which goes high each time 16 main clocks are counted, that is each time the count value becomes equal to 1, as shown in FIG. 20h.

The inverter 78c, AND gates 78a, 78b, D-flipflops 79, 80, inverter 81d and the AND gate 81a synchronize the signal PLL out supplied from the PLL circuit 25 by the synchronous timing signal as shown in FIG. 20i. Thus the signal PWM On, which goes high for one internal clock period at a timing when the pulse width of the PWM In signal becomes minimum, that is at a timing when the main clock count value becomes equal to 1 as shown in FIGS. 20g and 20k, is outputted via the AND gate 81a, as shown in FIG. 20l. This signal PWM On, specifying the PWM on period, is supplied to the output controller 30 as later explained, and is used for sample-holding the back-electromotive voltage.

The signal PWM On signal is also supplied to the inverter 81c which inverts the signal PWM On for forming internal clocks as shown in FIG. 20j. The internal clocks, thus generated, are sent to the mask circuit 21, edge detector 22, time delay unit 23, starting unit 24 and to the three-phase logic unit 28.

The pulse width of the signal PWM On and that of the internal clock are set to such pulse widths (speeds) which may be followed by the back-electromotive voltage comparator 2 (FIG. 1).

Figure 21:
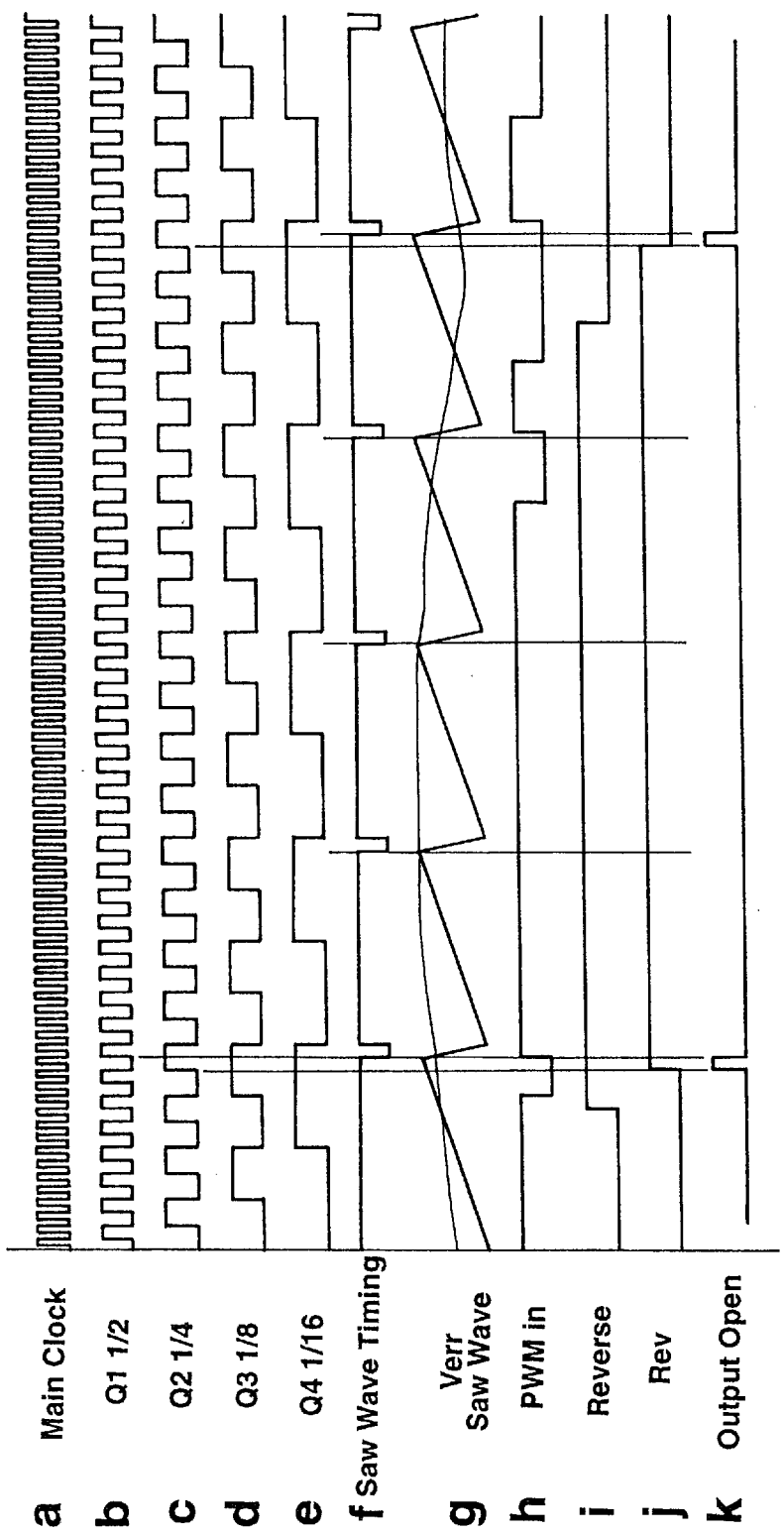
FIG. 21 is a timing chart for illustrating the operation of prohibiting the through-current of the motor driving apparatus shown in FIG. 7.

When the rpm of the three-phase motor 1 becomes faster than a pre-set value such that rotational servo signals supplied from, for example, the servo control system, become minus inputs for lowering the rpm, the reversing signal Reverse shown in FIG. 21i is outputted by the full-wave rectifying circuit 3. This reversing signal, configured for applying rotational braking to the three-phase motor 1 by supplying the current in the opposite direction, is supplied to the AND gate 73a fed with the output of the AND gate 64a.

The AND gates 73a and 73b, inverter 73c, OR gate 73d and the D-flipflop 74 form the signal Rev, which is a signal synchronized with the timing of counting 16 main clocks shown in FIG. 21a, from the reversing signal, and sends the signal Rev to the output controller 30. This signal Rev is synchronized with the maximum amplitude point of the saw wave shown in FIG. 21g.

The signal Rev from the D-flipflop 74 is fed to the D-flipflop 75, inverters 67 and 72c and to the AND gate 72b. The D-flipflop 75 synchronizes the signal Rev with respect to the main clocks and transmits the synchronized signal Rev to the AND gate 72b via the AND gate 72a and the inverter 72d.

The timings of the count outputs Q1 to Q4, the signal Saw Wave Timing and the signal PWM In are shown in FIGS. 21b to 21f and 21h, respectively.

The signal Rev is a signal used for supplying the current in the reverse direction to the three-phase motor 1 for on/off controlling the upper and lower layer transistors configured for supplying the source voltage to the phase coils 1U, 1V and 1W. If the upper and lower layer transistors are on/off controlled by the signal Rev, the two transistors may be turned on simultaneously and remain in this state for a certain time period due to difference in the switching speeds of the transistors. At such time, the through-current flows through both transistors.

The current value of the two transistors is detected as the current values supplied to the respective phase coils 1U, 1V and 1W so as to be used for forming the comparison output Verr in the comparator 4. Thus, such through-current obstructs correct rotational control of the three-phase motor 1. In such case, the timing controller 27 generates an output open signal Output Open for simultaneously turning both transistors off for prohibiting generation of the through-current.

That is, the AND gates 69a, 69b, inverter 69c, OR gate 69d, D-flipflop 70, AND gates 71, 72a, 72b, inverters 72c, 72d, OR gate 72e and the inverter 72f synchronously differentiates the signal Rev with the main clocks, based upon the motor on/off control signal (M ON/OFF) for motor on/off control supplied from the CPU and the signal Rev, for generating a signal Output Open which goes high for two main clocks at the rise and decay timings of the signal Rev. The signal Output open is supplied to the output controller 30.

With the motor driving apparatus of the instant embodiment, bi-polar transistors are used for the upper and lower layer transistors. Thus the pulse width of the signal Output Open is set to, for example, 2 $\mu$sec to 4 $\mu$sec, corresponding to two main clock pulses, in keeping with the bi-polar transistor characteristics.

Figure 22:
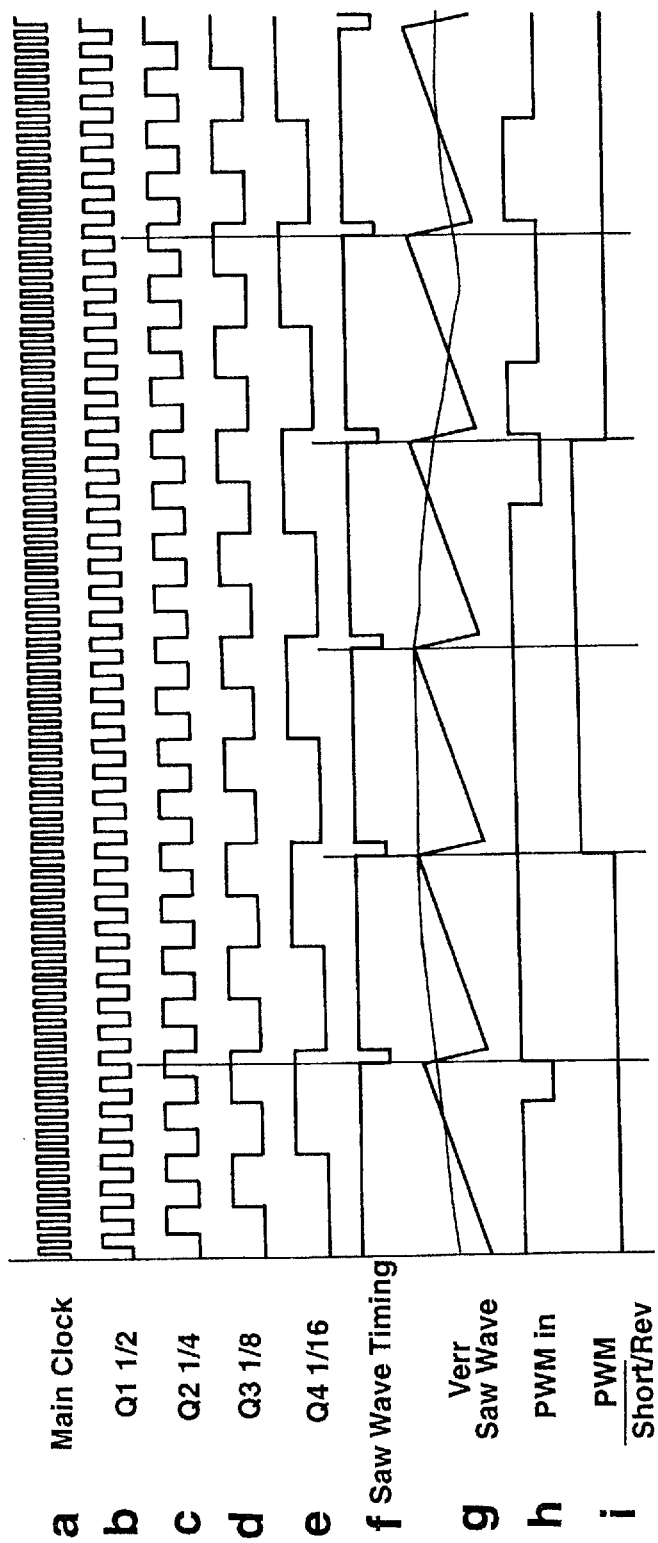
FIG. 22 is a timing chart for illustrating the switching operation of switching between the short braking system and the current conduction braking system in the motor driving apparatus shown in FIG. 7.

The timing controller 27 samples the signal PWM In, shown in FIG. 22h, supplied from the PWM circuit 7, at a timing of counting 16 main clocks shown in FIGS. 22a to 22g, by the AND gates 65a and 65b, inverter 65c, OR gate 65d, D-flipflop 66, inverter 67 for inverting the signal Rev, and the OR gate 68, for forming a signal PWM inverted Short/Rev for braking control of the three-phase motor 1 as shown FIG. 22i, and outputs the signal to the output controller 30. If the signal PWM inverted Short/Rev is at the low level, short braking for generating counter-torque by utilizing the motor rotating current is applied, whereas, if the signal PWM inverted Short/Rev is at the high level, the reverse current supplying braking is applied for positively flowing the current from outside the motor for generating the counter-torque.

Figure 23:
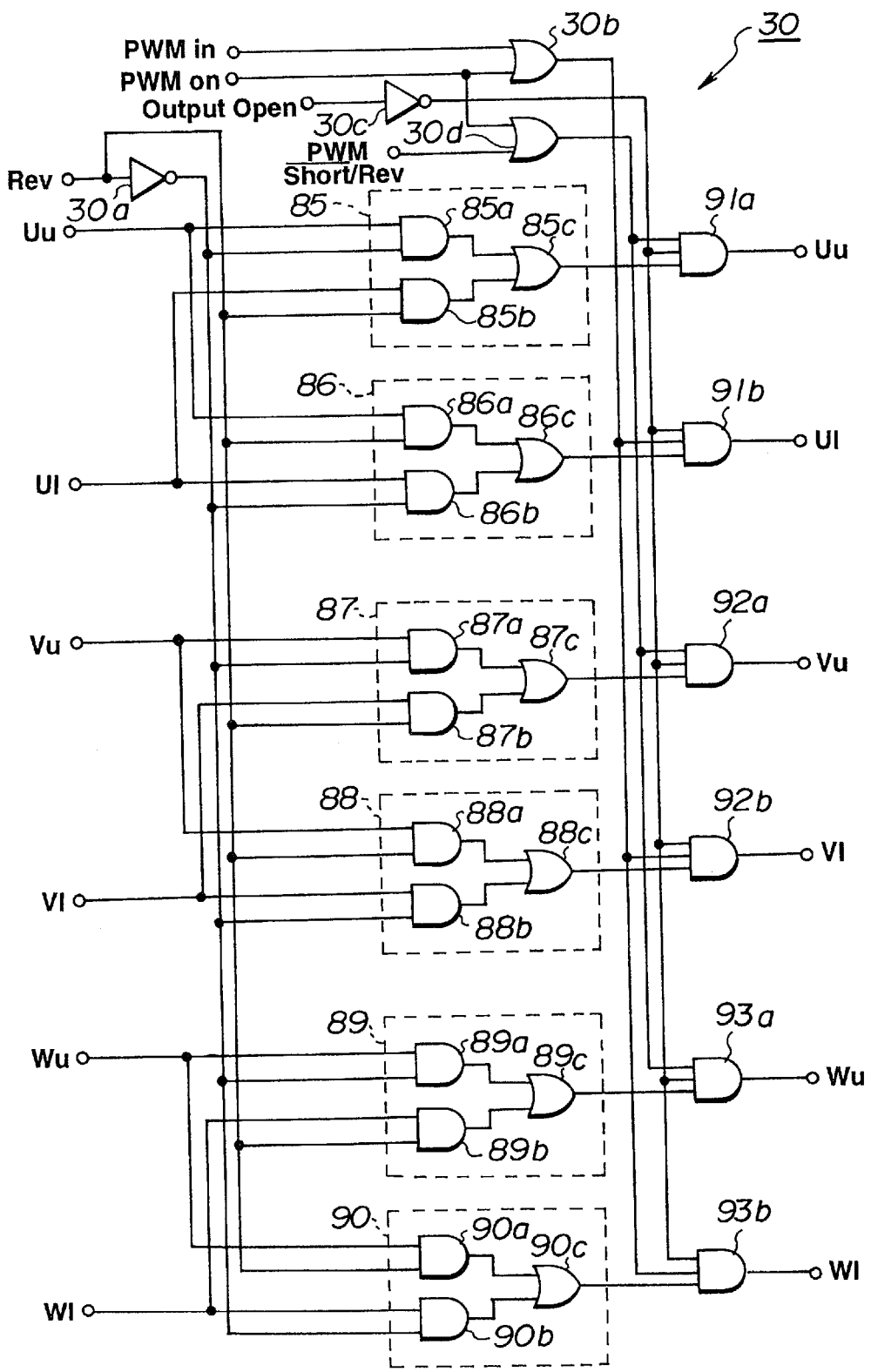
FIG. 23 is a timing chart for illustrating an output controller provided in the logic unit shown in FIG. 11.

Referring to FIG. 23, the output controller 30 includes a Uu signal forming unit 85, a Ui signal forming unit 86, a Vu signal forming unit 87, a Vi signal forming unit 88, a Wu signal forming unit 89 and a Wi signal forming unit 90, supplied with the first to sixth control signals Uu to Wi from the decoding unit 29, decoding the signals and outputting the decoded signals, an inverter 30a for inverting the signal Rev from the timing controller 27 for outputting the inverted signal, an OR gate 30b for taking the logical sum of the signals PWM In and PWM On, an inverter 30c for inverting the signal Output Open and outputting the inverted signal, an OR gate 30d for taking the logical sum of the signal PWM On and the signal PWM inverted Short/Rev and AND gates 91a, 91a, 92a, 92b, 93a and 93b provided in the output stages of the first to sixth control signals Uu to Wi, respectively.

The Uu signal forming unit 85 includes an AND gate 85a for taking the logical product of the first control signal Uu supplied from the decoding unit 29 and the signal Rev supplied via the inverter 30a, an AND gate 85b for taking the logical product of the signal Rev and the second control signal Ui supplied from the decoding unit 29 and an OR gate 85c for taking the logical sum of the outputs of the AND gates 85a, 85b.

The Ui signal forming unit 86 includes an AND gate 86a for taking the logical product of the signal Rev and the first control signal Uu supplied from the decoding unit 29, an AND gate 86b for taking the logical product of the second control signal Ui supplied from the decoding unit 29 and the signal Rev supplied from the inverter 30a and an OR gate 86c for taking the logical sum of outputs of the AND gates 86a and 86b.

The Vu signal forming unit 87 includes an AND gate 87a for taking the logical product of the third control signal Vu supplied from the decoding unit 29 and the signal Rev supplied via the inverter 30a, an AND gate 87b for taking the logical product of the signal Rev and the fourth control signal Vi supplied from the decoding unit 29 and an OR gate 87c for taking the logical sum of the outputs of the AND gates 87a and 87b.

The Vi signal forming unit 88 includes an AND gate 88a for taking the logical product of the signal Rev and the third control signal Vu supplied from the decoding unit 29, an AND gate 88b for taking the logical product of the fourth control signal Vi supplied from the decoding unit 29 and the signal Rev supplied from the inverter 30a and an OR gate 88c for taking the logical sum of outputs of the AND gates 88a and 88b.

The Wu signal forming unit 89 includes an AND gate 89a for taking the logical product of the fifth control signal Wu supplied from the decoding unit 29 and the signal Rev supplied via the inverter 30a, an AND gate 89b for taking the logical product of the signal Rev and the sixth control signal Wi supplied from the decoding unit 29 and an OR gate 89c for taking the logical sum of the outputs of the AND gates 89a and 89b.

The Wi signal forming unit 90 includes an AND gate 90a for taking the logical product of the signal Rev and the fifth control signal Wu supplied from the decoding unit 29, an AND gate 90b for taking the logical product of the sixth control signal Wi supplied from the decoding unit 29 and the signal Rev supplied from the inverter 30a and an OR gate 90c for taking the logical sum of outputs of the AND gates 90a and 90b.

The AND gate 91a takes the logical product of outputs of the OR gate 85c of the Uu signal forming unit 85 and the OR gates 30b, 30d for outputting the first control signal Uu, while the AND gate 91b takes the logical sum of outputs of the OR gate 86c of the Ui signal forming unit 86 and the OR gates 30b, 30d for outputting the second control signal Ui.

The AND gate 92a takes the logical product of outputs of the OR gate 87c of the Vu signal forming unit 87 and the OR gates 30b, 30d for outputting the third control signal Vu, while the AND gate 92b takes the logical sum of outputs of the OR gate 88c of the Vi signal forming unit 88 and the OR gates 30b, 30d for outputting the fourth control signal Vi.

The AND gate 93a takes the logical product of outputs of the OR gate 89c of the Wu signal forming unit 89 and the OR gates 30b, 30d for outputting the fifth control signal Wu, while the AND gate 93b takes the logical sum of outputs of the OR gate 90c of the Wi signal forming unit 90 and the OR gates 30b, 30d for outputting the sixth control signal Wi.

The above-described output controller 30 modulates, in the AND gates 91a, 91b, 92a, 92b, 93a and 93c, the first to sixth control signals Uu to Wi by PWM based upon the signal PWM In supplied from the PWM circuit 7, and outputs the modulated signals. The output controller 30 also modulates the signal PWM On for detecting the back-electromotive voltages in the phase coils 1U, 1V an d 1W, signal Output Open for prohibiting the through-current, signal PWM inverted Short/Rev for switching between the short braking and the reverse direction current supplying braking for prohibiting the through-current and the signal Rev for applying the current in the reverse direction, and outputs the modulated signals.

These first to sixth control signals Uu to Wi, as well as the signals PWM On, Output open, PWM inverted Short/Rev and Rev, are sent to the driving circuit 10 shown in FIG. 7.

Figure 24:
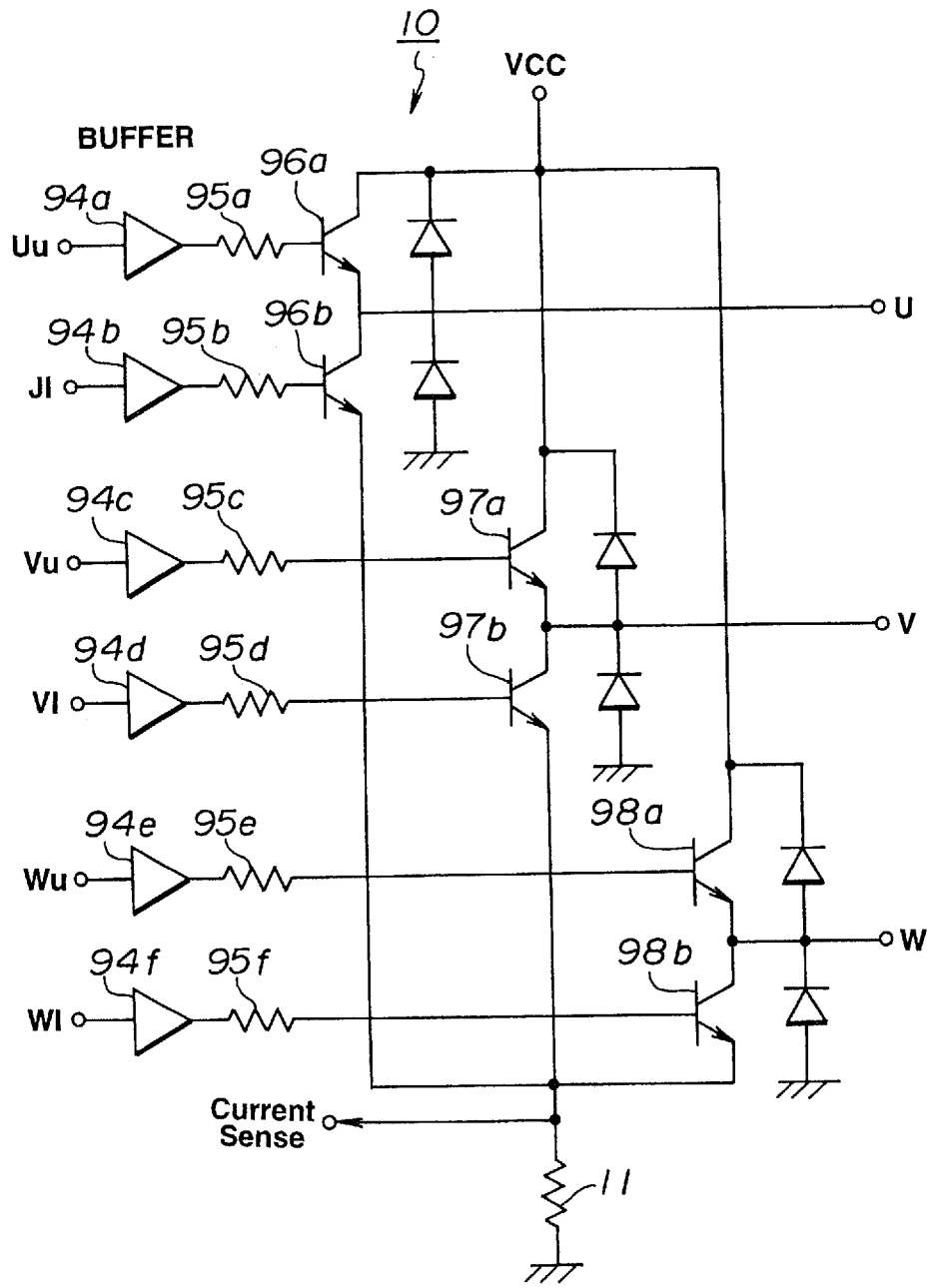
FIG. 24 is a circuit diagram of a driving unit provided in the motor driving apparatus shown in FIG. 7.

The driving unit 10 includes buffer amplifiers 94a to 94f for amplifying the first to sixth control signals Uu to Wi from the output controller 30, as well as the signals PWM On, Output open, PWM inverted Short/Rev and Rev, with a pre-set gain, and resistors 95a to 95f provided downstream of the output stages of the buffer amplifiers 94a to 94f, as shown in FIG. 24.

The driving unit 10 includes an upper-layer transistor 96a for first control signal Uu, whose base is connected to the resistor 95a, and a lower-layer transistor 96b for second control signal Ui, whose base is connected to the resistor 95b. The driving unit 10 also includes an upper-layer transistor 97a for third control signal Vu, whose base is connected to the resistor 95c, and a lower-layer transistor 97b for the fourth control signal Vi, whose base is connected to the resistor 95d. The driving unit 10 also includes an upper-layer transistor 98a for fifth control signal Wu, whose base is connected to the resistor 95e, and a lower-layer transistor 98b for sixth control signal Wi, whose base is connected to the resistor 95f.

The collectors of the upper layer transistors 96a, 97a and 98a are connected to the source voltage VCC, while the lower layer transistors 96b, 97b and 98b are connected to the current detection resistor 11 for detecting the current supplied to the respective phase coils 1U, 1V and 1W of the three-phase motor 1. The emitters of the upper layer transistors 96a, 97a and 98a are connected to the collectors of the lower layer transistors 96b, 97b and 98b. The driving voltage supplied to the phase coils 1U, 1V and 1W of the three-phase motor 1 is taken out at junction points of the emitters of the upper layer transistors 96a, 97a and 98a to the collectors of the lower layer transistors 96b, 97b and 98b.

If fed with the first to sixth control signals, the driving unit 10 is responsive thereto for on/off control of the upper layer transistors 96a, 97a and 98a and the lower layer transistors 96b, 97b and 98b. The source voltage Vcc is taken out at the above-mentioned junction points responsive to the on/off control of the upper layer transistors 96a, 97a and 98a and the lower layer transistors 96b, 97b and 98b so as to be supplied as driving voltages U, V and W to the respective phase coils 1U, 1V and 1W of the three-phase motor 1 shown in FIG. 7.

The driving currents supplied to the phase coils 1U, 1V and 1W are detected by the current detection resistor 11 in the form of voltages. The driving voltages, detected by the current detection resistor 11, are integrated by the integration circuit consisting of the resistor 5 and the capacitor 6 and thence supplied to the comparator 4. The comparator 4 compares the integrated driving voltages to the reference value Vrec for routing the comparison output Verr to the PWM circuit 7. The PWM circuit 7 compares the saw wave formed based upon the signal Saw Wave Timing to the comparison output Verr to route the result of comparison as the PWM In signal (PWM carrier) to the logic unit 9. This enables the first to sixth control signals to be formed in the logic unit 9 responsive to the PWM In signal for direct PWM driving of the three-phase motor 1, that is for directly rotationally driving the three-phase motor 1 by the PWM In signal. In addition, since the rotational position of the rotor may be detected based upon the back-electromotive voltage generated in the phase coils 1U, 1V and 1W, for performing switching control of the current supplying state to the phase coils 1U, V and 1W, rotation control of the three-phase motor 1 may be realized without providing rotational position detection means, such as Hall elements (sensor-less driving).

The entire operation of the motor driving apparatus of the instant embodiment is explained in detail. During normal rotation, the back-electromotive voltages Uin, Vin and Win, shown in FIG. 8a, are compared in the comparator 2 to the common voltage COM, for forming comparison outputs U, V and W shown in FIGS. 8b to 8d. The comparison outputs U, V and W are supplied to the logic unit 9. The logic unit 9 takes the exclusive OR of the comparison outputs U, V and W to form an Exor signal as shown in FIG. 8f. Since the kickback noise is superimposed on the Exor signal at the timing of current supply timing, the logic unit 9 masks the kickback noise by the first mask signal Mask1 of a pre-set pulse width, formed at the kickback noise generating timing (current supply switching timing), shown in FIG. 8j, in order to form a signal Masked Exor shown in FIG. 8f.

The logic unit 9 then synchronously differentiates the signal Masked Exor using the internal clocks shown in FIG. 8h in order to form the signal SD Exor shown in FIG. 8g. Using the SD Exor signal as a trigger, the logic unit 9 forms a signal Delay T, delayed 30 degrees electric, as shown in FIG. 8i, and samples one of the comparison outputs U, V and W from the comparator 2 for forming signals Ures, Vres and Wres. These signals Ures, Vres and Wres are held by the registers 28i, 28j and 28k. At this time, only the phase for which the back-electromotive voltage is to be captured is sample-held by a third mask signal, formed by decoding the signals Ures, Vres and Wres, as shown in FIGS. 8o to FIG. 8q. Thus the signals Ures, Vres and Wres, shown in FIGS. 8k to 8m, are outputted from the registers 28i, 28j and 28k.

The decoding unit 29 then forms the driving voltages Uu, Ui, Vu, Vi, Wu and Wi, shown in FIGS. 8r to 8w, from the signals Ures, Vres and Wres, for on/off control of the upper and lower layer transistors of the respective phase coils, and routes the driving voltages to the output controller 30. The output controller 30 overlays the signal Rev, signal Output Open, signal PWM On and the signal PWM inverted Short/Rev on the driving voltages Uu, Ui, Vu, Vi, Wu and Wi, in order to supply the overlaid signals to the driving unit 10. The driving unit 10 runs the three-phase motor 1 in rotation by the driving voltages U, V and W, formed by the upper and lower layer transistors of the respective phases being on/off controlled by the driving voltages Uu, Ui, Vu, Vi, Wu and Wi.

Figure 25:
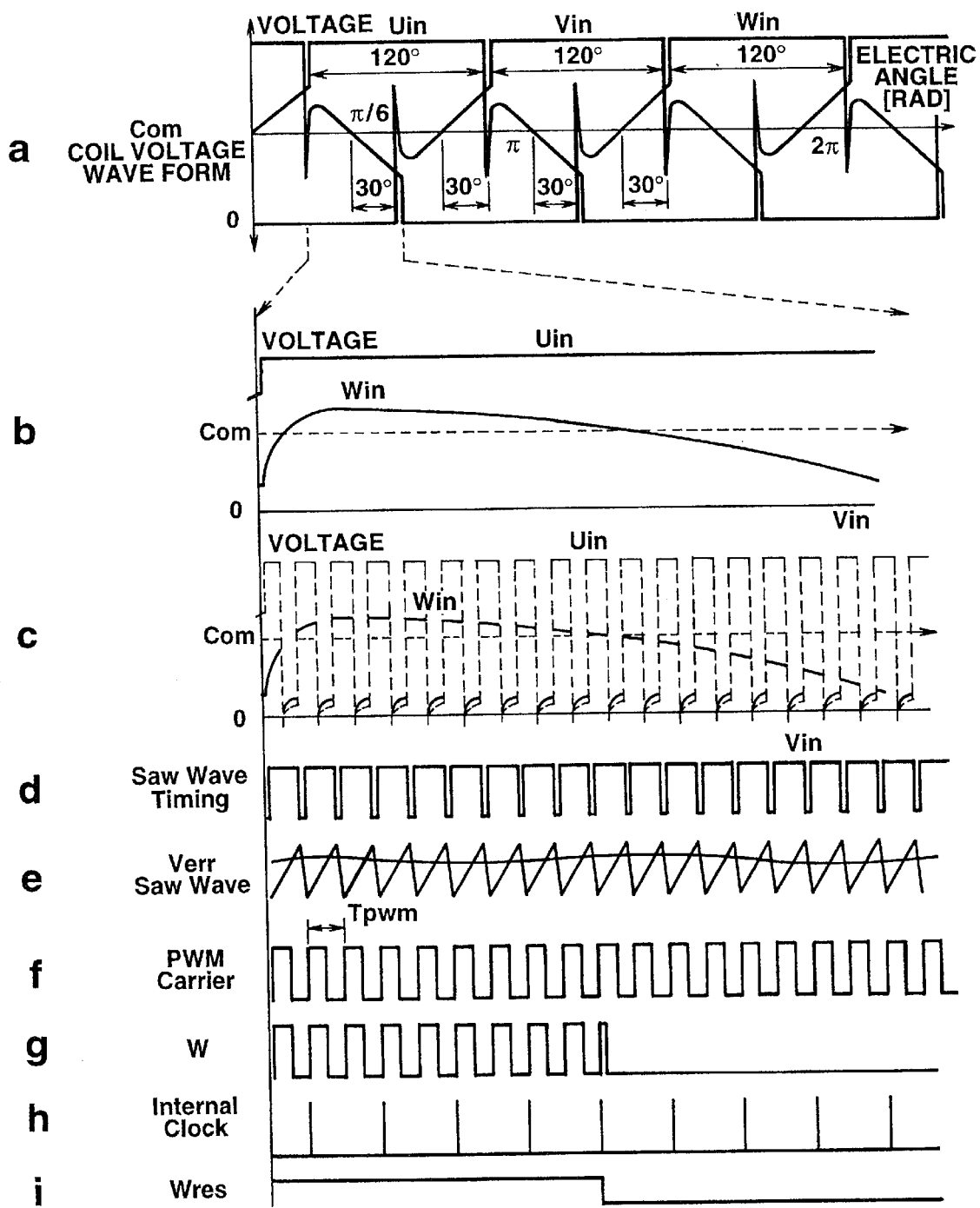
FIG. 25 is a timing chart for illustrating the PWM operation during normal rotation of the motor driving apparatus shown in FIG. 7.

The PWM operation during such normal rotation is explained. From the phase coils 1U, 1V and 1W of the three-phase motor 1, the back-electromotive voltages Uin, Vin and Wins, shown in FIG. 25a, are generated. Of these, the back-electromotive voltage Win is shown enlarged in FIG. 25b. On direct PWM driving, the back-electromotive voltage Win is interrupted by the signal Saw Wave Timing, serrated wave Saw Wave and by the signal PWM In (PWM Carrier) formed by the comparison output Verr from the comparator 4, shown in FIGS. 25d, 25e and 25f, respectively, while the comparison outputs W (and U, V) from the comparator 2, supplied with the back-electromotive voltages Uin, Vin and Win, are also interrupted as shown in FIG. 25g.

If the signal PWM In is on, as shown in FIG. 25c, the back-electromotive voltages Uin, Vin and Win are manifested, whereas, if the signal PWM In is off, the W-phase terminal voltage (as well as the U- and V-phase terminal voltages) falls to the minus level, while the common voltage COM falls to the ground level. Thus, if the PWM In signal is off, the back-electromotive voltage becomes non-detectable. Stated differently, if the signal PWM In is on, the back-electromotive force is detectable.

Thus the timing controller 27 forms internal clocks, shown in FIG. 25h, produced on synchronous differentiation at the minimum pulse width position of the signal PWM In as described above. This internal clock is synchronized with the on-domain of the signal PWM In. Using the internal clocks, the comparison outputs U, V and W shown in FIG. 25g are sampled. The sampled outputs are sample-held by the register 28k for W (as well as register 28i for U and register 28j for W) shown in FIG. 11 and issued as outputs.

In this manner, even if the comparison output W (as well as U and V) are interrupted by the signal PWM In, the non-interrupted comparison output W (output Wres of the register 28k for W) as shown in FIG. 25i can be formed. This enables detection of the back-electromotive voltages Uin, Vin and Win even although PWM driving is being carried out, such that direct PWM driving becomes feasible even with the sensor-less motor driving apparatus such as the motor driving apparatus. This allows the omission of the voltage conversion circuit 507 for converting the signal PWM In into a voltage signal. In addition, self-oscillation during start-up possibly inhibiting rotation may be eliminated for improving starting characteristics.

Since the back-electromotive voltages Uin, Vin and Win are sampled based upon the signal Delay T, the back-electromotive voltages Uin, Vin and Win can be sampled at positions delayed a pre-set time from the zero-crossing points of the back-electromotive voltages Uin, Vin and Win and the common voltage COM. This allows for more positive capturing of the back-electromotive voltage than if the back-electromotive voltage is captured at the zero-crossing point, thus enabling smooth starting of the rotation.

If the back-electromotive voltage cannot be detected by the above sampling, that is if the three-phase motor 1 cannot be rotated, the current supplying pattern is stepped by one stage by the signal Step for positively starting the three-phase motor 1.

In addition, since the kickback noise is masked by the first masking signal Mask1 for forming the Exor signal, the zero-crossing point of the respective back-electromotive voltages and the common voltage COM can be detected positively and the back-electromotive voltage can be captured positively for prohibiting malfunction otherwise caused by the kickback noise. Since the kickback noise is eliminated by the above masking, the filter circuit 501 for eliminating the kickback noise may be omitted. Since the voltage conversion circuit 507 and the filter circuit 501 may be eliminated, the motor driving apparatus may be produced at reduced costs through reducing the number of components and simplifying the structure.

In addition, since the current supplying pattern which will be manifested next is predicted based upon the current supplying pattern and, if the actually detected current supplying pattern is not the predicted current supplying pattern, the contents of the registers 28i to 28k are inverted by the signal Invert and the inverted contents are outputted, correct current supply may be achieved responsive to the current rotational direction. Thus there is no risk of the motor being driven in the reverse direction with respect to the prevailing rotating direction.

Figure 26:
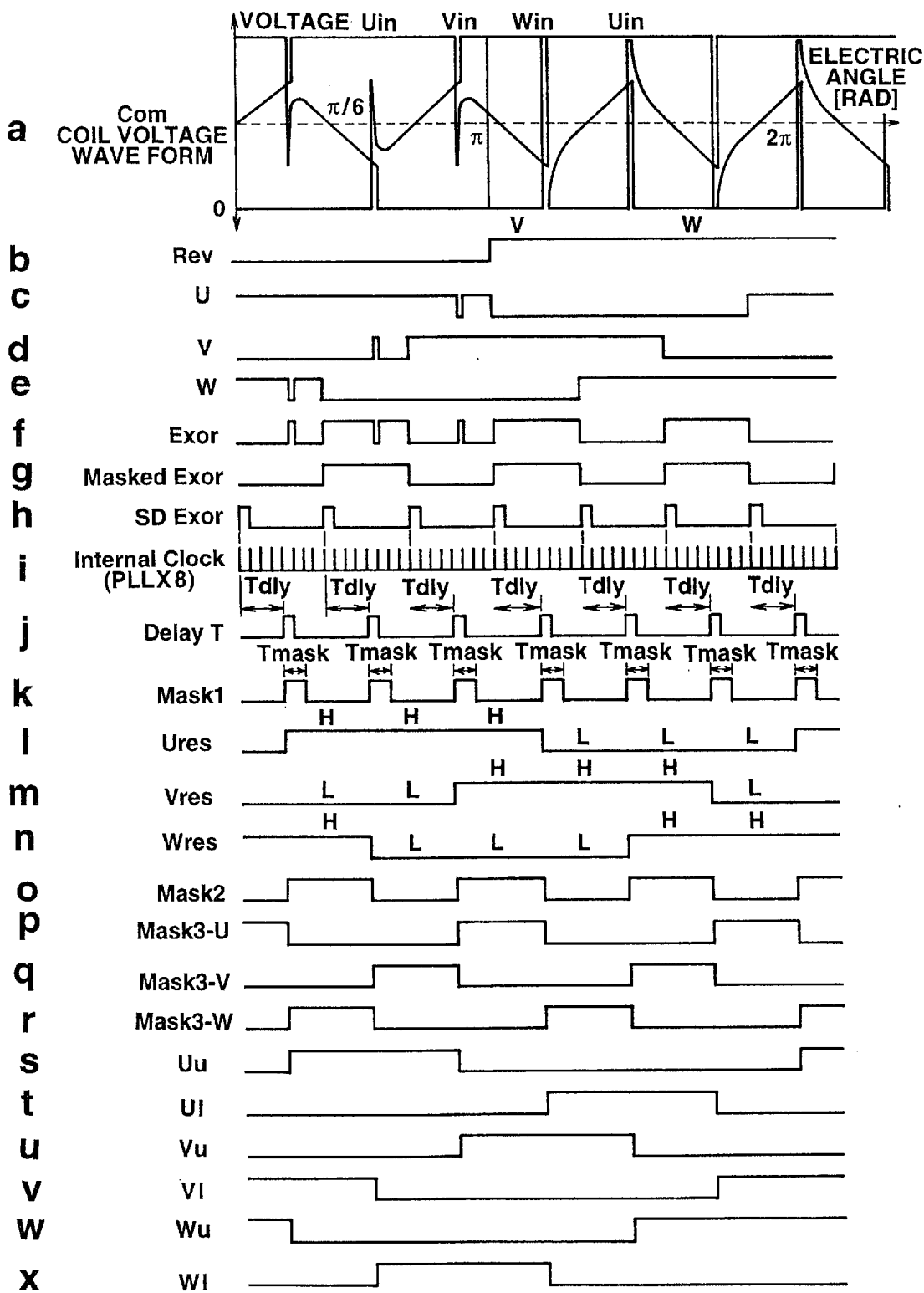
FIG. 26 is a circuit diagram for illustrating the switching operation of switching from the usual rotation to the counter current applying braking system of the motor driving apparatus shown in FIG. 7.
Figure 27:
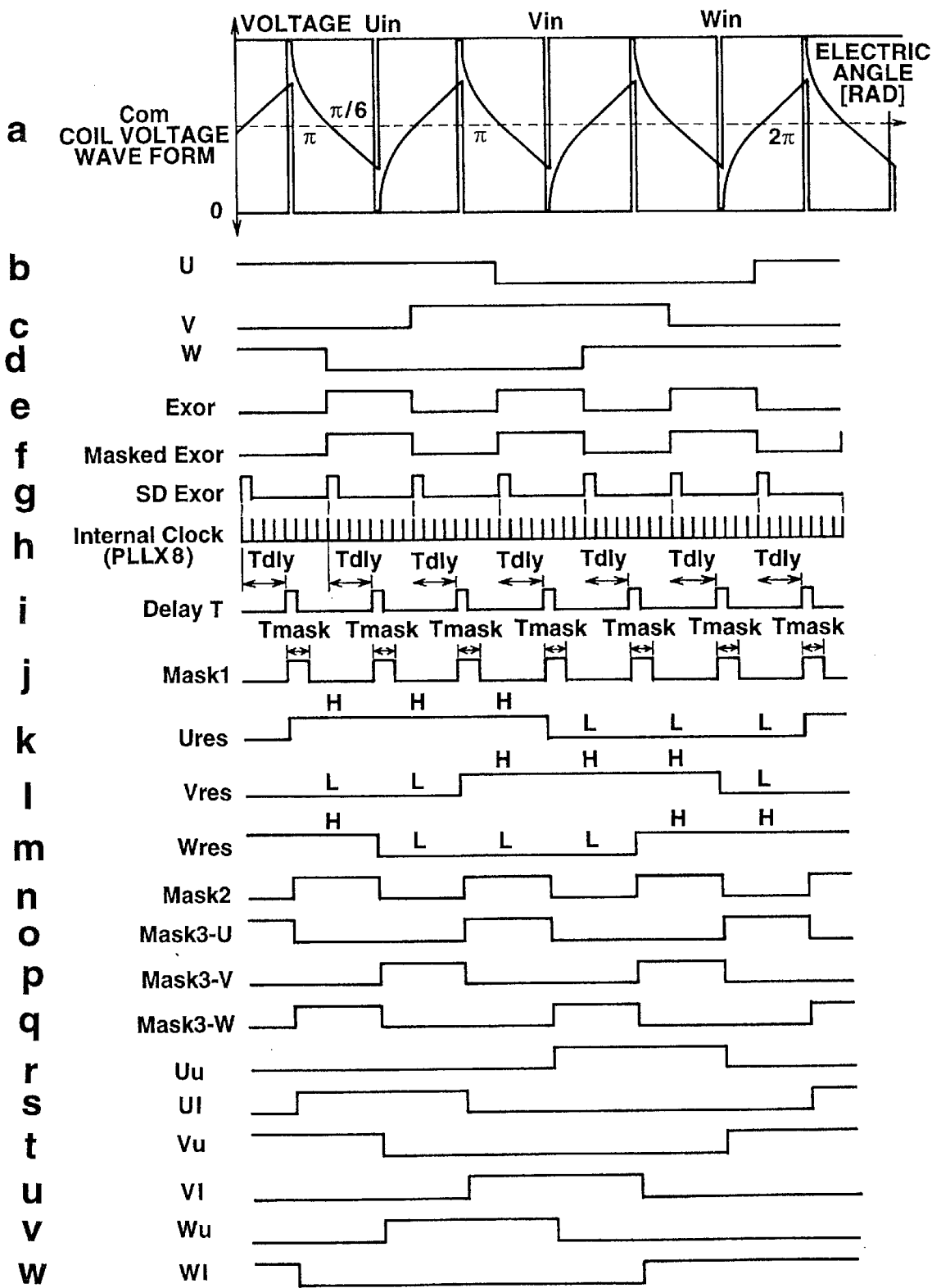
FIG. 27 is a timing chart for illustrating the operation during counter direction current supplying braking application of the motor driving apparatus shown in FIG. 7.
Figure 28:
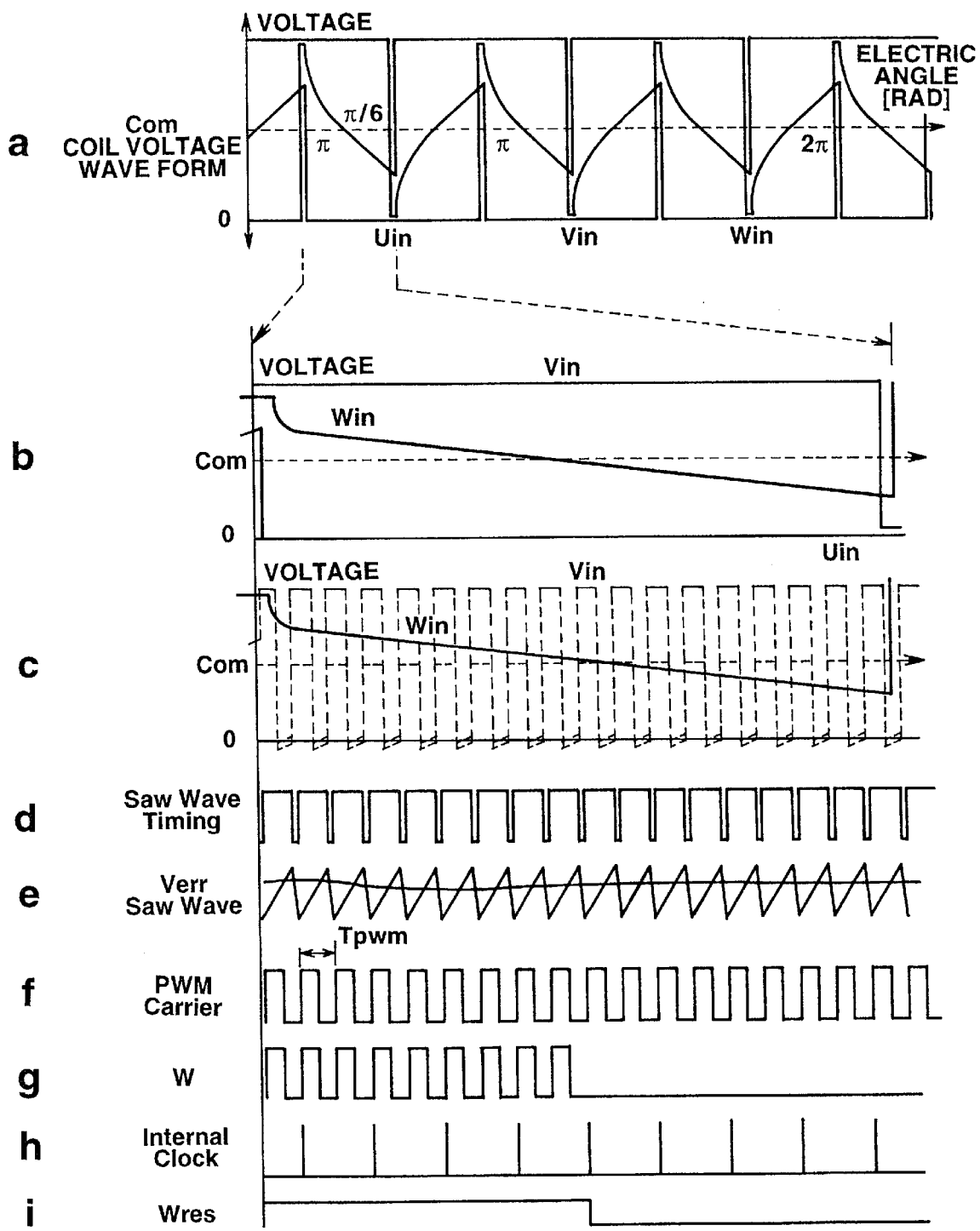
FIG. 28 is a timing chart for illustrating the PWM operation during counter direction current supplying braking application of the motor driving apparatus shown in FIG. 7.

FIG. 26 shows signal timings on switching from usual rotational control to the counter direction current supplying braking.

If the reversing signal is outputted by the full-wave rectifying circuit 3, the signal Rev shown in FIG. 26b is formed, based upon the reversing signal as described above. The control is switched to the counter direction current supplying braking, such that the three-phase motor 1 is fed with current in the reverse direction and thereby braked. The operation of various portions during this reverse direction current supplying braking is not changed from that during the above-described usual rotation, as shown in FIGS. 26c to 26x and 27a to 27w. The PWM operation during this reverse direction current supplying braking is not changed from that during the above-described usual rotation, as shown in FIGS. 28a to 28i.

Thus, by sampling only the back-electromotive voltage of the phase undergoing changes in the back-electromotive voltage, at the timing when the back-electromotive voltage is changed, and sample-holding the back-electromotive voltage by the registers 28i to 28k, counter direction current supplying braking can be applied at the normal current supplying timing.

The switching between the short braking and the counter direction current supplying braking is caused to occur by sampling the signal PWM In shown in FIG. 22h at the timing of 16 counts of the main clocks shown in FIG. 22a, that is at a timing when the pulse width of the pulse width modulation becomes maximum. If the signal PWM inverted Short/Rev, a sampled output, shown in FIG. 22i, is at a low level and at a high level, the short braking and the counter direction current supplying braking are applied, respectively.

The following description is made with reference to the upper layer transistor 96a for Uu, lower layer transistor 96b for Ui, upper layer transistor 97a for Ui and the lower layer transistor 97b for Vi. During short braking, the current flowing out from the V-phase coil 1V flows through the lower-layer transistor 97b for Vi, current detection resistor 11 and the diode Du before being returned to the U-phase coil 1U, as indicated by a solid line in FIG. 29. This results in short braking.

Figure 29:
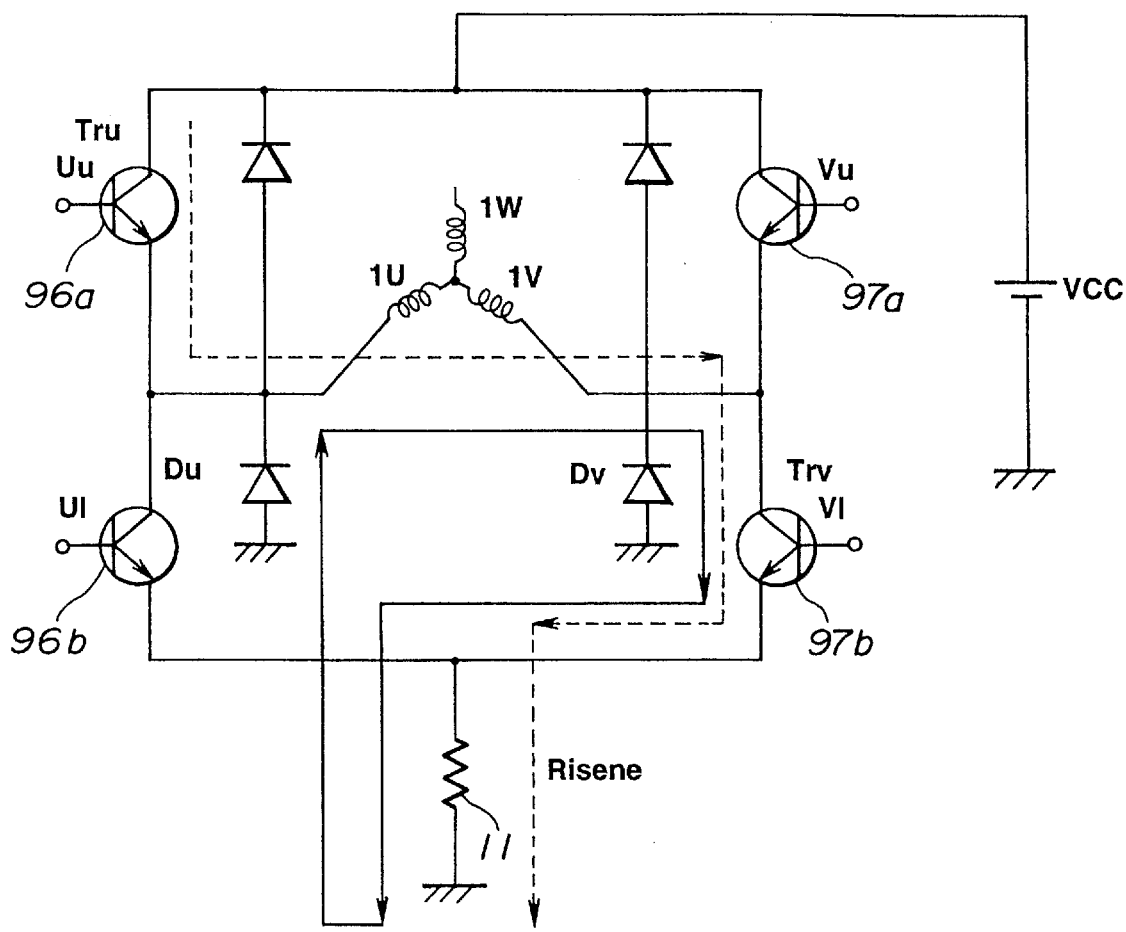
FIG. 29 is a timing chart for illustrating the current path during counter direction current supplying braking and current path during short braking of the motor driving apparatus shown in FIG. 7.

During the counter direction current supplying braking, the current from the source voltage Vcc via the upper layer transistor 96a for Uu flows through the U-phase coil 1U, V-phase coil 1V, lower-layer transistor 97b for Vi and the current detection resistor 11, before being returned to the source voltage Vcc, as shown by a broken line in FIG. 29. In both cases, the above-mentioned current braking is feasible since the current traverses the current detection resistor 11.

The short braking is a passive braking system comprising generating the counter-torque by utilizing the current for motor rotation control, while the counter direction current supplying braking is an active braking system comprising positively supplying the current from outside the motor for generating the counter-torque. With the motor driving apparatus of the instant embodiment, these two braking systems of different characteristics may be smoothly switched with the aid of the signal PWM inverted Short/Rev in such a manner that the short braking is first used for gradually applying the braking for lowering the rpm and by applying powerful braking by counter direction current supplying braking when the pulse width becomes maximum by PWM, thereby lowering the rpm. This improves linearity of operation and response characteristics such as by fast servo lock of rotational servo.

In the driving unit 10, shown in FIG. 24, the transistors of the respective layers 96a, 96b, 97a, 97b, 98a and 98b, on/off controlled by the first to sixth control signals Uu to Wi, are turned off gradually. Although these transistors are desirably turned on only gradually, the bi-polar transistors are turned off acutely. Thus the upper and lower layer transistors may be turned on simultaneously and remain in the turned-on state, such that the current from the source voltage Vcc flows at a time through these upper and lower layer transistors into the current detection resistor 11. This through-current obstructs positive current driving in the motor driving apparatus.

For prohibiting the through-current, the timing controller 27 forms the signal Rev, shown in FIG. 21j, synchronized with the timing of 16 counts of the main clocks shown in FIG. 21a, based upon the reversing signal, for applying the counter direction current supplying braking shown in FIG. 21i. The signal Rev is synchronously differentiated at the maximum pulse width position for PWM for forming the signal Output Open as shown in FIG. 21k. This signal Output Open is overlaid on the first to sixth control signals as described above so as to be supplied to the transistors of the respective layers 96a, 96b, 97a, 97b, 98a and 98b.

In this manner, the upper and lower layer transistors are compulsively turned off during short braking and reverse direction current supplying braking during the time when the signal Output Open is at a high level thus prohibiting the through-current for assuring positive current driving.

Although the motor driving apparatus of the above-described embodiment is configured for driving control of the three-phase motor 1, it may also be applied to a rotational driving apparatus for other multi-phase motors, such as a two-phase motor or a four-phase motor. Also, in the above-described embodiment, the main clocks are 500 kHz in frequency and 16 of these clocks are counted for forming various timing control signals. This, however, may be changed according to design parameters. In addition, many other modifications may be made without departing from the technical scope of the present invention.

What is claimed is:

1. A motor driving apparatus comprising:
    comparison means for comparing back-electromotive voltages appearing in respective phases of a multi-phase motor to a common reference voltage;
    pulse width modulating means for outputting a pulse width modulated signal for rotationally driving said motor based upon a rotational error signal of said motor;
    minimum pulse width detection means for detecting the minimum pulse width position of the pulse width modulated signal from said pulse width modulation means;
    sample-and-hold means for sample-holding comparison outputs of said comparison means at a timing of detection of the minimum pulse width of said pulse width modulated signal from said minimum pulse with detection means; and
    motor driving means for rotationally driving the motor based upon each sample-and-hold output from said sample-and hold means.

2. The motor driving apparatus as claimed in claim 1, wherein said sample-and-hold means includes:

exclusive OR detection means for detecting an exclusive OR of comparison outputs of said comparison means;

masking processing means for detecting the current supplying switching timing to the respective phases for forming masking signals of a pre-set pulse width at the detected timing, removing the kickback noise overlaid on the exclusive OR outputs from said exclusive OR detection means at the current supplying switching timing to said respective phases, forming a masking signal of a pre-set pulse width at the detected timing, removing a kickback noise overlaid on the exclusive OR output of said exclusive OR detection means at the current supply switching timing by said masking signal and outputting a resulting masking processed signal;

edge detection means for detecting rising and falling edges of the masking processed signal output by said masking processing means;

sampling means for sampling comparison outputs of said comparison means based upon an edge detection output of said edge detection means; and holding means for sample-holding the sampled output of said sampling means except for a phase for which a back-electromotive voltage is captured.

3. The motor driving apparatus as claimed in claim 2, further comprising delay means for delaying the edge detection output of said edge detection means a pre-set period of time;

wherein said sampling means samples each comparison output from said comparator means based upon a delayed output of said delay means for supplying the sampled output to said holding means.

4. The motor driving apparatus as claimed in claim 3, further comprising current supplying state switching controlling means for detecting whether the edge detection output of said edge detection means is being supplied and for varying contents of said holding means if said edge detection output is not supplied for a pre-set time, the current supplying state switching controlling means for effecting switching control of the current supplying state to each phase of the motor.

5. The motor driving apparatus as claimed in claim 2, wherein said edge detection means detects the rising edge and the falling edge of the masking processed output of said masking processing means, said edge detection means detecting a prevailing current conducting state and estimating, based upon the prevailing current supplying state, whether the edge of the masking processing output to be supplied next is a rising edge or a falling edge, said current supplying state switching controlling means inverting an output of said holding means if an edge other than the estimated edge is detected by said edge detection means, said edge detection means for effecting switching control of the current supplying state to each phase.

6. A motor driving apparatus comprising:

comparison means for comparing each back-electromotive voltage appearing in each phase of a multi-phase motor to a common voltage which is a voltage at a neutral point of the motor;

reversing signal outputting means for outputting a reversing signal for applying a counter direction current supplying braking by generating a counter-torque by flowing current through the motor based upon a motor rotation error signal supplied from outside;

pulse width modulation means for outputting a pulse width modulated signal for rotationally driving the motor based upon the motor rotation error signal;

minimum pulse width detection means for detecting the minimum pulse width position of the pulse width modulated signal from said pulse width modulation means;

sampling means for sampling each comparison output of said comparator means at a detection timing of the minimum pulse width position of said pulse width modulation signal from said minimum pulse width detection means;

affected phase detection means for detecting on being fed with the reversing signal from said reversing signal outputting means a phase in which a change in each back-electromotive voltage is produced based upon each comparison output sampled by said sampling means;

holding means for holding a comparison output of a phase other than the phase in which the change in the back-electromotive voltage as detected by said affected phase detection means is produced; and motor driving means for braking the motor based upon each sample-held output of said holding means.

7. The motor driving apparatus as claimed in claim 1, further comprising maximum pulse width detection means for detecting a maximum pulse width position of the pulse width modulated signal from said pulse width modulation means;

wherein the sampling means samples the comparison outputs of said comparison means at a detection timing of the maximum pulse width position, said motor driving mean brakes the motor by short braking of generating a counter-torque in said motor until detection of the maximum pulse width position of the pulse width modulated signal by said maximum pulse width detection means, and said motor driving means brakes the motor by counter direction current supplying braking on detection of the maximum pulse width position of said pulse width modulated signal.

8. A motor driving apparatus of a sensor-less system for detecting a rotational position of a multi-phase rotor based upon each back-electromotive voltage appearing in each phase of the multi-phase motor, on/off controlling an upper layer transistor and a lower layer transistor of each phase responsive to the results of detection for switching the current supplying states to each phase for rotationally driving the motor, comprising:

switching timing detection means for detecting a timing of switching a direction of rotation of the motor; and controlling means for simultaneously turning off the upper layer transistor and the lower layer transistor of each phase for a pre-set time at the timing of switching of the direction of rotation as detected by said switching timing detection means.

9. The motor driving apparatus as claimed in claim 8, further comprising:

comparison means for comparing back-electromotive voltages appearing in respective phases of the multi-phase motor to a common voltage which is a neutral point voltage of said multi-phase motor;

pulse width modulating means for outputting pulse width modulated signals for rotationally driving said motor based upon a motor rotation error signal;

minimum pulse width detection means for detecting a minimum pulse width position of the pulse width modulated signal from said pulse width modulation means;

sample-and-hold means for sample-holding comparison outputs of said comparison means at a timing of detection of the minimum pulse width position of said pulse width modulated signal by said minimum pulse width detection means; and motor driving means for forming a control signal for each phase for on/off driving the upper layer transistors and the lower layer transistors based upon each sample-and-hold output from said sample-and-hold means.

10. A motor driving apparatus of a sensor-less system for detecting a rotational position of a multi-phase rotor based upon each back-electromotive voltage appearing in each phase of the multi-phase motor, on/off controlling an upper layer transistor and a lower layer transistor of each phase responsive to the results of detection for switching the current supplying states to each phase for rotationally driving the motor, comprising:

switching timing detection means for detecting a timing of switching a direction of rotation of the motor;

controlling means for simultaneously turning off the upper layer transistor and the lower layer transistor of each phase for a pre-set time at the timing of switching of the direction of rotation as detected by said switching timing detection means;

comparison means for comparing back-electromotive voltages appearing in respective phases of the multi-phase motor to a common voltage which is a neutral point voltage of said multi-phase motor;

pulse width modulating means for outputting pulse width modulated signals for rotationally driving said motor based upon a motor rotation error signal;

minimum pulse width detection means for detecting a minimum pulse width position of the pulse width modulated signal from said pulse width modulation means;

sample-and-hold means for sample-holding comparison outputs of said comparison means at a timing of detection of the minimum pulse width position of said pulse width modulated signal by said minimum pulse width detection means; and motor driving means for forming a control signal for each phase for on/off driving the upper layer transistors and the lower layer transistors based upon each sample-and-hold output from said sample-and-hold means;

wherein said switching timing detection means detects the maximum pulse width position of said pulse width modulated signal for detecting the timing of switching the direction of rotation.

11. A driving apparatus for a sensor-less multi-phase motor, comprising:

a comparator circuit for comparing voltages from each phase of the motor to a common voltage and for generating comparison output signals;

a pulse width modulation circuit for outputting pulse width modulated signals for rotationally driving the motor based upon a rotational error signal of the motor;

a logic unit for receiving the comparison output signals and the pulse width modulated signals and for generating driving signals; and a driver unit for receiving the driving signals and for controlling the multi-phase motor based on the driving signals.

12. The driving apparatus as set forth in claim 11, wherein the logic unit processes the comparison output signals to remove kickback noise.

13. The driving apparatus as set forth in claim 11, wherein the logic unit comprises:

an exclusive OR circuit for obtaining an exclusive OR signal of the comparison output signals;

a mask circuit for receiving a mask signal and the exclusive OR signal and for generating a masked exclusive OR signal indicating zero crossing points of the comparison output signals, the mask circuit removing kickback noise from the exclusive OR signal.

14. The driving apparatus as set forth in claim 13, wherein the logic unit further comprises:

an edge detector circuit for generating a trigger signal by synchronously differentiating the masked exclusive OR signal;

a delay circuit for receiving the trigger signal and for generating a delay signal having a predetermined time delay from the trigger signal; and sample-and-hold circuitry for capturing the comparison output signals at a timing determined by the delay signal.

15. The driving apparatus as set forth in claim 11, wherein the logic unit comprises a starter circuit for stepping the motor to a subsequent current supplying pattern if the voltages from the phases of the motor have not been detected for a predetermined period of time.

16. The driving apparatus as set forth in claim 11, wherein the logic unit comprises circuitry for altering the driving signals if the detected current supplying pattern is not equal to a predicted current supplying pattern.

17. The driving apparatus as set forth in claim 11, wherein the logic unit comprises circuitry for sampling the comparison output signals at a time when the pulse width modulated signals are at a maximum value.

* * * * *

UNITED STATES PATENT AND TRADEMARK OFFICE
CERTIFICATE OF CORRECTION

PATENT NO. :    5,869,944
DATED      :    February 9, 1999
INVENTOR(S) :   Shoji TANINA It is certified that error appears in the above-identified patent and that said Letters Patent is hereby corrected as shown below:

Claim 7 should read:

-- 7. The motor driving apparatus as claimed in claim 1, further comprising maximum pulse width detection means for detecting a maximum pulse width position of the pulse width modulated signal from said pulse width modulation means;

wherein the sampling means samples the comparison outputs of said comparison means at a detection timing of the maximum pulse width position, said motor driving means brakes the motor by short braking of generating a counter-torque in said motor until

UNITED STATES PATENT AND TRADEMARK OFFICE
CERTIFICATE OF CORRECTION

PATENT NO. : 5,869,944
DATED : February 9, 1999
INVENTOR(S) : Shoji TANINA

It is certified that error appears in the above-identified patent and that said Letters Patent is hereby corrected as shown below:

detection of the maximum pulse width position of the pulse width modulated signal by said maximum pulse width detection means, and said motor driving means brakes the motor by counter direction current supplying braking on detection of the maximum pulse width position of said pulse width modulated signal. -

Signed and Sealed this

Tenth Day of August, 1999

*Attest:*

*Attesting Officer*

Q. TODD DICKINSON

*Acting Commissioner of Patents and Trademarks*